United States Patent [19]

Nakayama et al.

[11] Patent Number: 4,961,231

[45] Date of Patent: Oct. 2, 1990

[54] PATTERN RECOGNITION METHOD

[75] Inventors: Hiroshi Nakayama, Yokohama; Keiji Kojima, Kawasaki; Gen Sato, Yokohama, all of Japan

[73] Assignee: Ricoh Company, Ltd., Japan

[21] Appl. No.: 140,131

[22] Filed: Dec. 31, 1987

[30] Foreign Application Priority Data

| Jan. 20, 1987 | [JP] | Japan | 62-10879 |
| Jan. 30, 1987 | [JP] | Japan | 62-20289 |
| Mar. 9, 1987 | [JP] | Japan | 62-53290 |

[51] Int. Cl.$^5$ ............................................. G06K 9/48
[52] U.S. Cl. ....................................... 382/21; 382/22
[58] Field of Search ...................... 382/21, 22, 25, 27, 382/30, 34, 48; 358/462, 464

[56] References Cited

U.S. PATENT DOCUMENTS

| 4,524,454 | 6/1985 | Ejiri | 382/21 |
| 4,757,551 | 7/1988 | Kobayashi et al. | 382/21 |
| 4,773,098 | 9/1988 | Scott | 382/21 |
| 4,813,078 | 3/1989 | Fujiwara et al. | 382/21 |

Primary Examiner—David K. Moore
Assistant Examiner—Jose L. Couso
Attorney, Agent, or Firm—Mason, Fenwick & Lawrence

[57] ABSTRACT

A pattern recognition method comprises a contour tracing step of a contour of a binary image in a predetermined direction along a predetermined type of pixels. At this time, four adjacent pixels on upper, lower, left-hand and right-hand sides of a point of interest are sequentially checked. Then, one pixel of a predetermined type out of the four adjacent pixels which is the first pixel of the predetermined type found by the check is designated as a next trace point subsequent to the point of interest. In this process, a feature of each of the traced pixels is extracted. The feature is represented by a directional code which indicates a direction of motion from the point of interest to the next trace point. The features are successively registered in a one-dimensional form. Histogram is produced for each sub-region storing a part of the one-dimensional feature sequence. A histogram for each sub-region is compared with a related reference histogram for a known character.

31 Claims, 41 Drawing Sheets

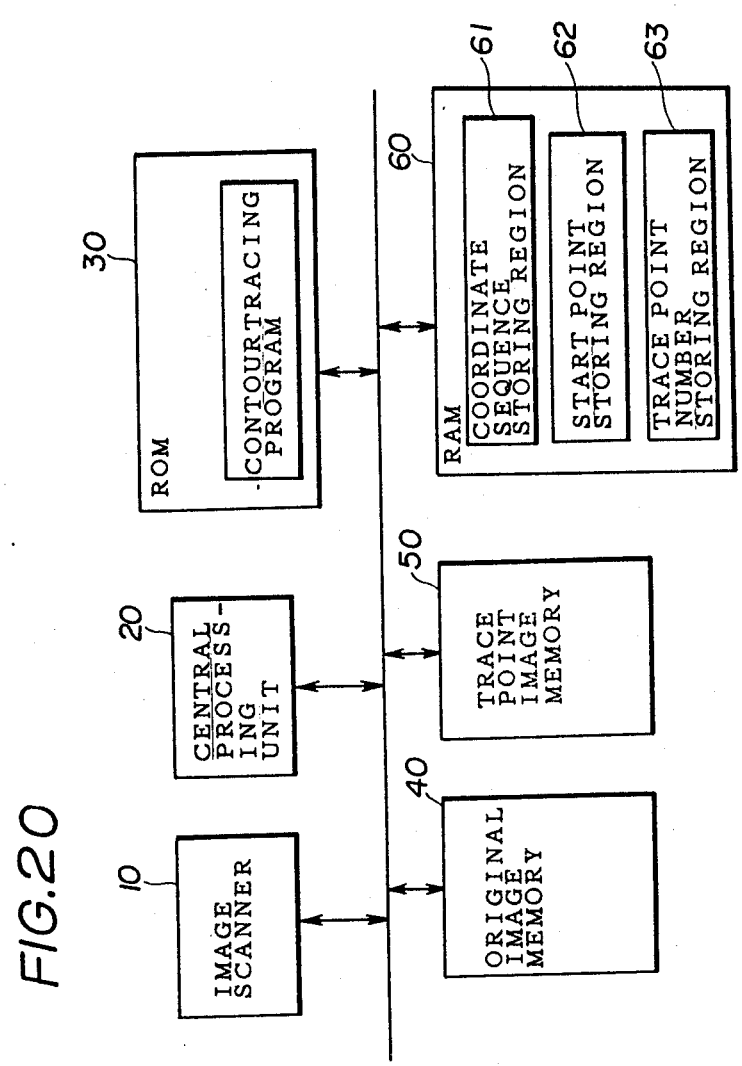

| VECTOR ΔlP | DIRECTIONAL CODE |
|---|---|
| (0, 1) | 1 |
| (1, 0) | 2 |
| (0, −1) | 3 |
| (−1, 0) | 4 |

FIG.27A  FIG.27B  FIG.27C
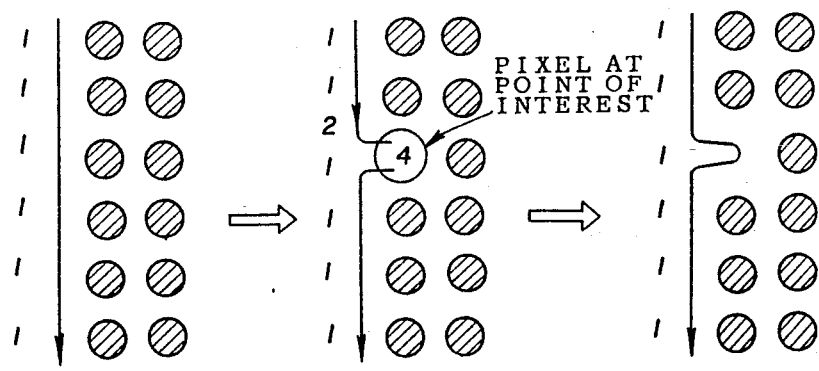
FIG.29A  FIG.29B  FIG.29C
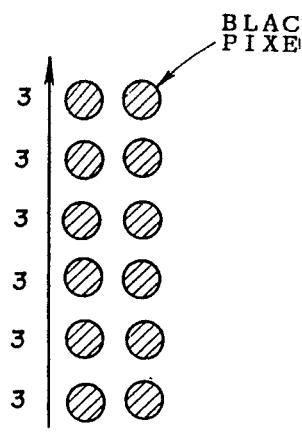 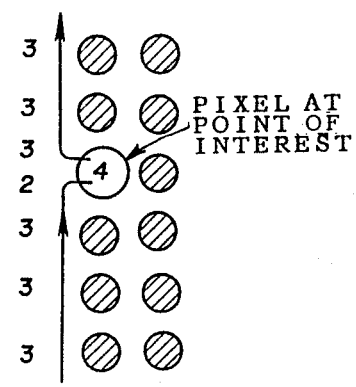 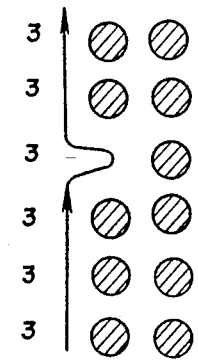

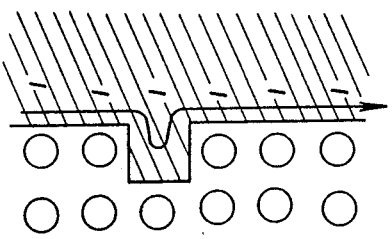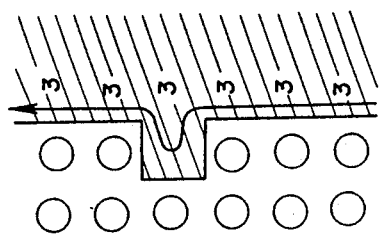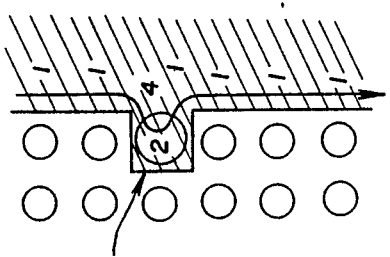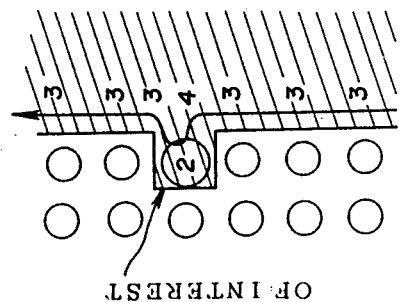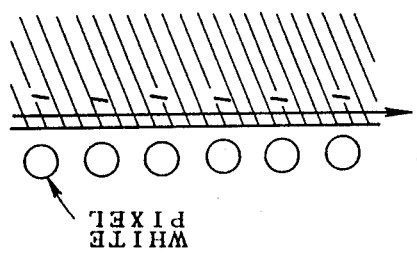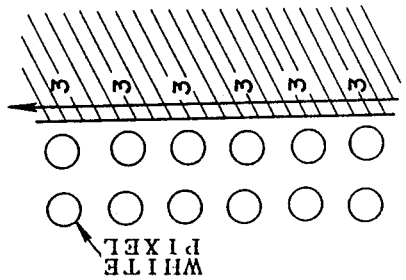

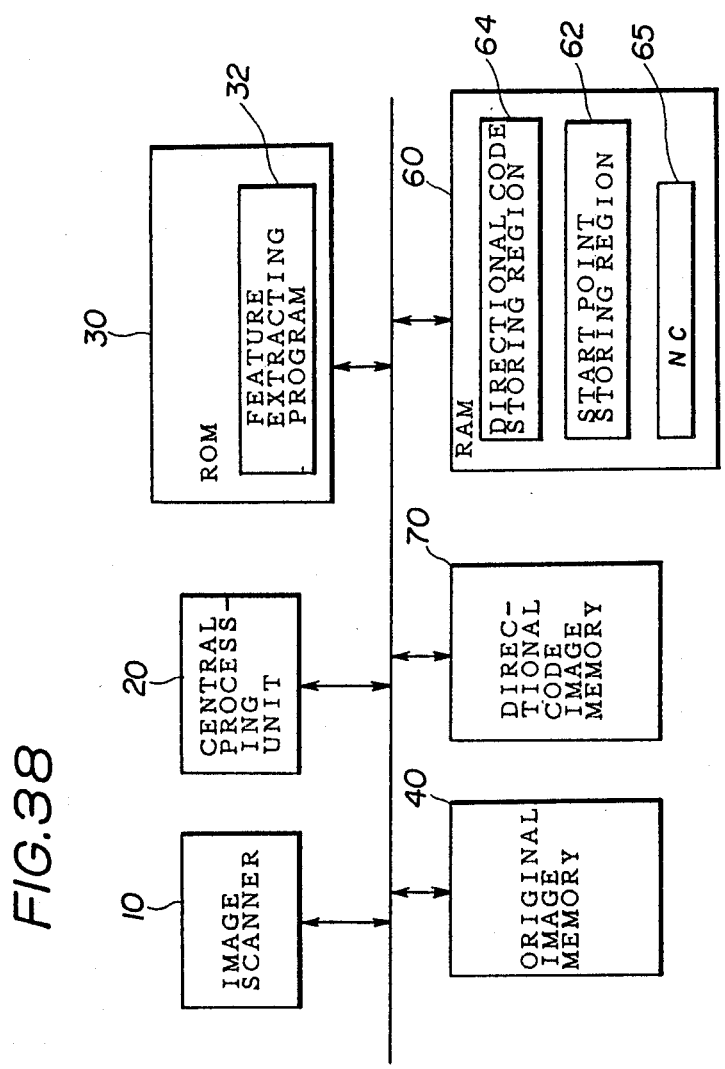

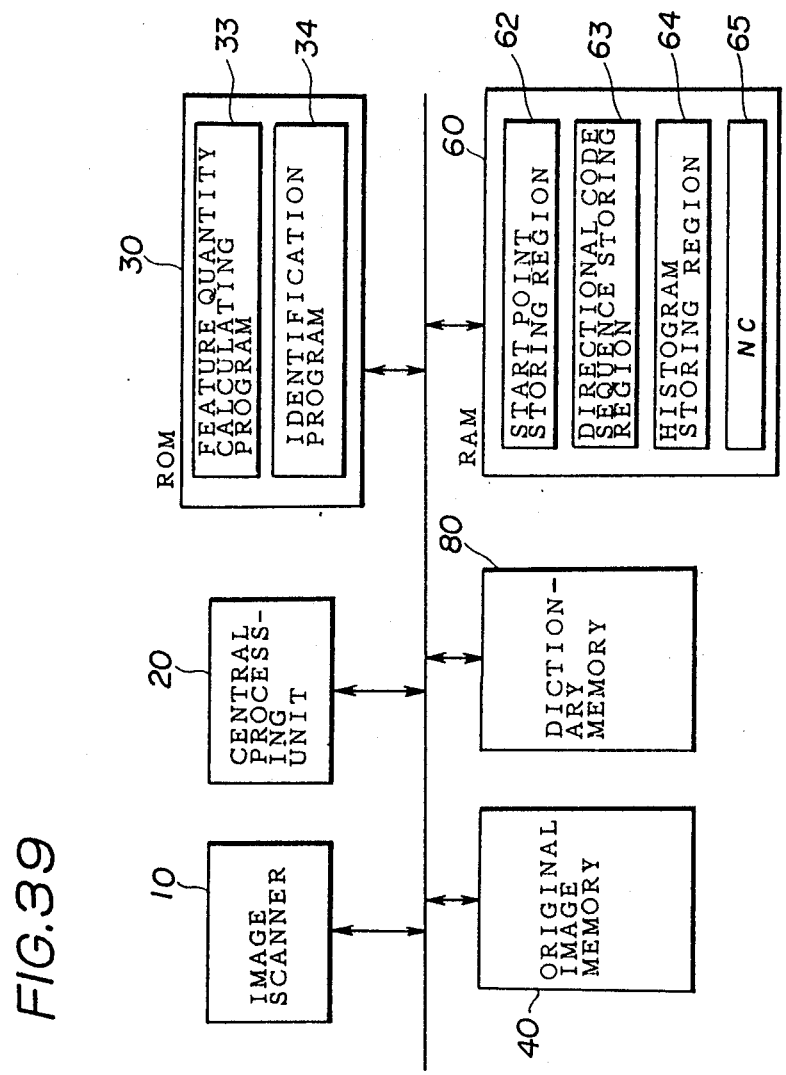

FIG.42A

| →x | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 |  |  |  |  |  | 1 | 4 | 4 | 4 | 4 | 4 |  |  |  |  |
| 2 |  |  |  |  | 1 | 4 | ■ | ■ | ■ | ■ | 3 | 4 |  |  |  |
| 3 |  |  |  | 1 | 4 | ■ | ■ | ■ | ■ | ■ | 3 | 4 | 4 |  |  |
| 4 |  |  | 1 | 4 | ■ | ■ | ■ | 2 | 1 | ■ | ■ | ■ | ■ | 3 |  |
| 5 |  |  | 1 | ■ | ■ | ■ | 2 | 3 | 2 | 1 | ■ | ■ | ■ | 3 |  |
| 6 |  |  | 1 | ■ | ■ | 2 | 3 |  |  | 2 | 2 | 2 | 2 | 3 |  |
| 7 |  |  | 1 | ■ | ■ | ■ | 3 | 4 |  |  |  |  |  |  |  |
| 8 |  |  | 1 | ■ | ■ | ■ | 3 | 4 |  |  |  |  |  |  |  |
| 9 |  |  | 2 | 1 | ■ | ■ | ■ | 3 | 4 | 4 |  |  |  |  |  |
| 10 |  |  |  | 2 | 1 | ■ | ■ | ■ | ■ | 3 | 4 |  |  |  |  |
| 11 |  |  |  | 2 | 2 | 1 | ■ | ■ | ■ | 3 | 4 |  |  |  |  |
| 12 |  |  |  |  |  | 2 | 1 | ■ | ■ | ■ | 3 | 4 |  |  |  |
| 13 |  |  |  |  |  |  | 2 | 1 | ■ | ■ | ■ | 3 | 4 |  |  |
| 14 |  |  |  |  |  |  |  | 2 | 1 | ■ | ■ | ■ | 3 |  |  |
| 15 |  |  |  |  |  |  |  |  | 2 | 1 | ■ | ■ | 3 |  |  |
| 16 |  | 1 | 4 | 4 | 4 | 4 |  |  |  | 1 | ■ | ■ | 3 |  |  |
| 17 |  | 1 | ■ | ■ | ■ | 3 | 4 |  | 1 | 4 | ■ | ■ | 3 |  |  |
| 18 |  | 2 | 1 | ■ | ■ | ■ | 3 | 4 | 4 | ■ | ■ | ■ | 3 |  |  |
| 19 |  |  | 1 | ■ | ■ | ■ | ■ | ■ | ■ | ■ | ■ | 2 | 3 |  |  |
| 20 |  |  | 2 | 1 | ■ | ■ | ■ | ■ | ■ | ■ | 2 | 3 |  |  |  |
| 21 |  |  |  | 2 | 2 | 1 | ■ | ■ | 2 | 2 | 3 |  |  |  |  |
| 22 |  |  |  |  |  | 2 | 2 | 2 | 3 |  |  |  |  |  |  |

FIG.42B

| 0 | 4 | 1 | 4 | 1 | 4 | 1 | 1 | 1 | 1 | 2 | 1 | 2 | 1 | 2 | 2 | 1 | 2 | 1 | 2 |
|---|---|---|---|---|---|---|---|---|---|---|---|---|---|---|---|---|---|---|---|
| 2 | 1 | 2 | 1 | 2 | 1 | 1 | 4 | 1 | 4 | 4 | 3 | 4 | 3 | 4 | 4 | 4 | 4 | 1 | 1 |
| 4 | 2 | 1 | 1 | 2 | 1 | 2 | 2 | 1 | 2 | 2 | 3 | 2 | 2 | 3 | 2 | 3 | 2 | 3 |
| 6 | 3 | 3 | 3 | 3 | 3 | 4 | 3 | 4 | 3 | 4 | 3 | 4 | 3 | 4 | 4 | 3 | 4 | 3 | 4 | 3 |
| 8 | 2 | 3 | 2 | 3 | 2 | 1 | 2 | 1 | 2 | 2 | 2 | 2 | 3 | 3 | 3 | 4 | 4 | 3 | 4 | 3 |
| 10 | 4 | 4 | 4 | 4 | 4 | 1 |  |  |  |  |  |  |  |  |  |  |  |  |  |  |

FIG.43

| SUB-REGION | DIRECTIONAL CODE | #1 | #2 | #3 | #4 |
|---|---|---|---|---|---|
| 1 | 4 1 4 1 4 1 1 1 1 1 2 1 2 | 8 | 2 | 0 | 3 |
| 2 | 1 2 2 1 2 1 2 1 2 1 2 1 1 | 7 | 6 | 0 | 0 |
| 3 | 4 1 4 4 4 3 4 3 4 4 4 4 1 | 2 | 0 | 2 | 9 |
| 4 | 1 2 1 1 2 1 2 2 1 2 2 2 3 | 5 | 7 | 1 | 0 |
| 5 | 2 2 2 3 2 3 2 3 3 3 3 3 3 | 0 | 5 | 8 | 0 |
| 6 | 4 3 4 3 4 3 4 4 4 3 4 3 | 0 | 0 | 6 | 7 |
| 7 | 4 3 2 3 2 3 2 1 2 1 2 2 2 | 2 | 7 | 3 | 1 |
| 8 | 2 3 3 3 4 4 3 4 3 4 4 4 4 1 | 1 | 1 | 5 | 8 |

PATTERN RECOGNITION METHOD

BACKGROUND OF THE INVENTION

The present invention generally relates to a pattern recognition method for written, handwritten, typed or printed characters or graphics. The present invention is suitable for an optical character recognition, image processing and the like.

Recently, a pattern recognition method for recognizing written, handwritten, typed or printed characters or graphics has been widely developed. For example, a character recognition, which is an application of the pattern recognition is composed of the following three steps. A first step of the character recognition is a step of tracing a contour of a binary image of an unknown character obtained by raster-scanning the character. A second step is a step of extracting features of the contour of the binary image. The features of the contour are generally expressed with 4- or 8-directional codes. A third step is a step of identifying the unknown character by comparing the extracted features of the contour with features of a known character.

A conventional character recognition method having the above three steps is disclosed in the Japanese Laid-Open Patent Application No. 22994/1984, for example. The first step disclosed in the above publication is a step of sequentially moving a trace point. At this time, a next trace point subsequent to a current trace point (a trace point of interest) is designated by referring to all of four or eight pixels adjacent to the point of interest. A combination of the adjacent pixels referred to is compared with reference pixel combinations (which are registered in the form of tables). Each reference table defines a trace point to be shifted to depending on a combination of white and black pixels adjacent to a center pixel (corresponding to the pixel at the point of interest). Therefore, the next tracing point is designated by the table having the pixel combination which is the same as the adjacent pixel combination with respect to the pixel of interest.

The second step disclosed in the publication assigns to the pixel at the point of interest a directional code corresponding to the combination of white and black adjacent pixels. It should be noted that the combination of white and black pixels is also referred to at the second step. For this reason, the reference pixel combinations (tables) define not only the next trace point subsequent to the point of interest but also directional codes depending on the combinations of white and black pixels.

The third step in the publication divides the region surrounding the character to be recognized into M×N (M and N are integers) sub-regions and calculates a distribution of the directional codes (histogram) for each sub-region. Then, the distribution of the directional codes for each sub-region is compared with reference directional code distributions (reference histograms) of characters. Finally, a character of the reference histogram which has the shortest distance (difference) with respect to the histogram of the unknown input pattern is identified as the unknown character.

However, the above conventional character recognition method has the following disadvantages.

First, the next trace point subsequent to the point of interest, i.e., the current trace point is designated by referring to all of four or eight adjacent pixels. For this reason, the quantity of data to be processed at the first step is enormous and thus an extremely long time is necessary to trace the contour of the character. Further, it is necessary to prepare a memory for storing the tables defining the reference pixel combinations used for designating the next trace point and the directional code of the pixel of interest.

Secondly, the feature or the directional code of the pixel of interest is also determined by referring to all of four or eight adjacent pixels. Therefore, the data quantity to be processed at the second step is also enormous.

Thirdly, the process for dividing the region surrounding the character to be processed into a plurality of the sub-regions is very complex. This is because the division of the region must be carried out for the two-dimensional (M×N) region. In addition, the directional codes do not necessarily exist in all of the sub-regions. This is frequently observed for relatively simple characters. This means that there is a possibility that a wasteful process for the region having no directional code is executed.

SUMMARY OF THE INVENTION

Accordingly, a general object of the present invention is to provide a new and novel pattern recognition method in which the disadvantages of the conventional pattern recognition method have been eliminated.

A more specific object of the present invention is to provide a pattern recognition method higher than the conventional method.

Another object of the present invention is to provide a pattern recognition method simpler than the conventional method.

Still another object of the present invention is to provide a pattern recognition method in which the quantity of data to be processed is smaller than that for the conventional method.

The above objects of the present invention are accomplished by a pattern recognition method comprising the steps of detecting a first change in color between two consecutive pixels in a direction of a raster scan which is carried out for a binary image of an unknown pattern, one of the two consecutive pixels being designated as a start point from which a trace of a contour of the binary image starts; and tracing the contour of the binary image in a predetermined direction along a predetermined type of pixels. At this time, four adjacent pixels on upper, lower, left-hand and right-hand sides of a point of interest are checked in a predetermined rotational direction starting from one pixel out of the four adjacent pixels which is positioned on a predetermined side at an angle of 90° with respect to a direction in which the trace proceeded towards the point of interest. Then, one pixel of a predetermined type out of the four adjacent pixels which is the first pixel of the predetermined type found by the check is designated as a next trace point subsequent to the point of interest. The present invention further comprises extracting a feature of each of the pixels at the traced points which form an image of the contour of the pattern; and identifying the unknown pattern by comparing the features of the unknown pattern with features of a known pattern.

In accordance with another aspect of the present invention, the feature is represented by a directional code which indicates a moving direction from the point of interest to the next trace point.

In accordance with still another aspect of the present invention, there is provided a pattern recognition method comprising the steps of tracing a contour of a binary image of an unknown pattern which is obtained by a raster scan; extracting a feature of each of the pixels at the traced points which form an image of the contour of the pattern; and registering the feature of each of the pixels in a memory region in order of appearance of the feature, so that a one-dimensional code sequence is registered in the memory region. The present invention further comprises the steps of dividing the memory region which stores the one-dimensional code sequence into one-dimensional sub-regions each including a plurality of partial code sequences; calculating a feature quantity for each sub-region; and identifying the unknown pattern by comparing the feature quantity for each sub-region of the unknown pattern with a feature quantity for each related sub-region of a known pattern.

Other objects and features of the present invention will become apparent from the following detailed description when read in conjunction with the attached drawings.

BRIEF DESCRIPTION OF THE DRAWINGS

FIG. 20 is a block diagram for implementing each of the above contour tracing processes;

FIGS. 23A through 23C are views showing a concrete example of the feature extracting process of the first example;

FIGS. 27A through 27C are views showing concrete examples of the feature extracting process of the third example;

FIGS. 29A through 29C are views showing concrete examples of the feature extracting processes of the fourth example;

FIGS. 35A through 35C are views showing concrete example of the feature extracting process provided by the present invention;

FIGS. 37A through 37C are views showing concrete examples of the feature extracting process of the eighth example;

FIG. 38 is a block diagram for implementing each of the above feature extracting process provided by the present invention;

FIG. 39 is a block diagram of a hardware for implementing a character recognition method according to the present invention;

FIG. 42A is a view showing a directional code assigned binary image;

FIG. 42B is a view showing a directional code sequence stored in a one-dimensional form;

FIG. 43 is a view showing an example of an equally divided histogram

FIGS. 46A through 46P are views showing tables used for extracting a feature of each of traced pixel.

DETAILED DESCRIPTION

Figures 1A, 1B:
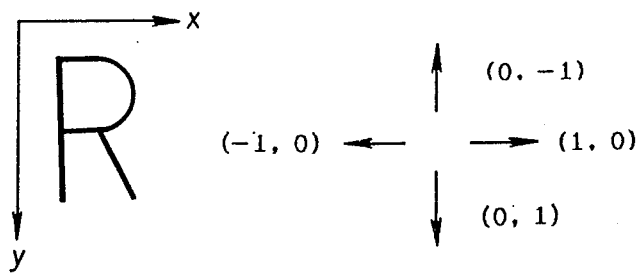
FIGS. 1A and 1B are views for explaining a unit vector $\Delta P$.

A description will be given on a contour tracing process which is one of essential processes of the present invention.

One of essential features of the present invention relates to tracing a contour of a binary image of an unknown character (a boundary of white and black pixels). A summary of a contour tracing process of the present invention is as follows.

Firstly, the binary image is raster-scanned and a start point (pixel) from which the contour tracing process of the binary image starts is detected based on an initial change from a white pixel to a black pixel. This start point is a white pixel which is first found by the raster scan and which is immediately followed by a black pixel in the direction of the raster scan when the contour is traced along white pixels. Alternatively, when the contour is traced along black pixels, a black pixel immediately following a white pixel which is the first white pixel found in the raster scan is the start point. A trace point subsequent to the start point and a movement of the trace point are designated as follows.

A movement from a point of interest (a current trace point) to a next trace pixel depends on combination of contour tracing directions (counterclockwise or clockwise direction) and data (or type) of pixels (white or black) to be traced.

When tracing the contour of the binary image in the counterclockwise direction along white pixels, four adjacent pixels positioned on upper, lower, left-hand and right-hand sides of the point of interest are sequentially checked in the clockwise direction starting from one pixel out of the four adjacent pixels which is positioned on the left-hand side at an angle of 90° with respect to a direction in which the trace proceeded towards the above point of interest. A white pixel which is first found by the clockwise checking process is designated as the trace point following the pixel of interest. When beginning the tracing, the start point is designated as the point of interest, and the above detection in which the trace proceeded towards the above trace point is assumed to be a direction opposite to a direction of said raster scan.

When tracing the contour in the clockwise direction along white pixels, four adjacent pixels positioned on upper, lower, left-hand and right-hand sides of the point of interest are sequentially checked in the counterclockwise direction starting from one pixel out of the four adjacent pixels which is positioned on the right-hand side at an angle of 90° with respect to a direction in which the trace proceeded towards the above point of interest. A white pixel which is first found by the counterclockwise checking process is designated as the trace point following the point of interest. When beginning the tracing, the start point is designated as the point of interest and the above detection in which the trace proceeded towards the above trace point is assumed to be a direction opposite to a direction of said raster scan.

When tracing the contour in the counterclockwise direction along black pixels, four adjacent pixels positioned on upper, lower, left-hand and right-hand sides of the point of interest are sequentially checked in the counterclockwise direction starting from one pixel out of the four adjacent pixels which is positioned on the right-hand side at an angle of 90° with respect to a direction in which the trace proceeded towards the above point of interest. A black pixel which is first found by the counterclockwise checking process is designated as the trace point following the point of interest. When beginning the tracing, the start point is designated as the point of interest and the above detection in which the trace proceeded towards the above trace point is assumed to be a direction opposite to a direction of said raster scan.

When tracing the contour in the clockwise direction along black pixels, four adjacent pixels positioned on upper, lower, left-hand and right-hand sides of the pixel of interest are sequentially checked in the clockwise direction starting from one pixel out of the four adjacent pixels which is positioned on the left-hand side at an angle of 90° with respect to a direction in which the trace proceeded towards the above point of interest. A black pixel which is first found by the clockwise checking process is designated as the trace point following the point of interest. When beginning tracing, the start point is designated as the point of interest and the above detection in which the trace proceeded towards the above trace point is assumed to be a direction opposite to a direction of said raster scan.

A description will be given of the above four cases and their modifications.

EXAMPLE 1

In example 1, the contour of the binary image is traced in the counterclockwise direction along white pixels. A contour tracing sequence of the example 1 is shown in FIG. 2.

FIG. 1A is a view for the raster-scan. A symbol x denotes a main scanning direction and a symbol y denotes a sub-scanning direction.

Next, a position vector P and a unit vector $\Delta$ P are explained. The following explanation of these vectors is commonly applicable to the embodiments described in the specification. When considering a position (coordinates) of a point of interest as a position vector, a movement from the point of interest to a next trace point can be expressed by one of four unit vectors $\Delta$ P indicating moving directions shown in FIG. 1B. In FIG. 1B, the right-hand and left-hand moving directions are represented by unit vectors $\Delta$ P=(1, 0) and $\Delta$ P=(−1, 0), respectively, and the upper and lower moving directions are represented as unit vectors $\Delta$ P=(0, −1) and $\Delta$ P=(0, 1), respectively. Therefore, the position (coordinates) of each destination from the point of interest may be obtained by adding the unit vector $\Delta$ P to the position vector P of the point of interest. The unit vector $\Delta$ P can indicate four trace point candidates subsequent to the point of interest.

Figure 2:
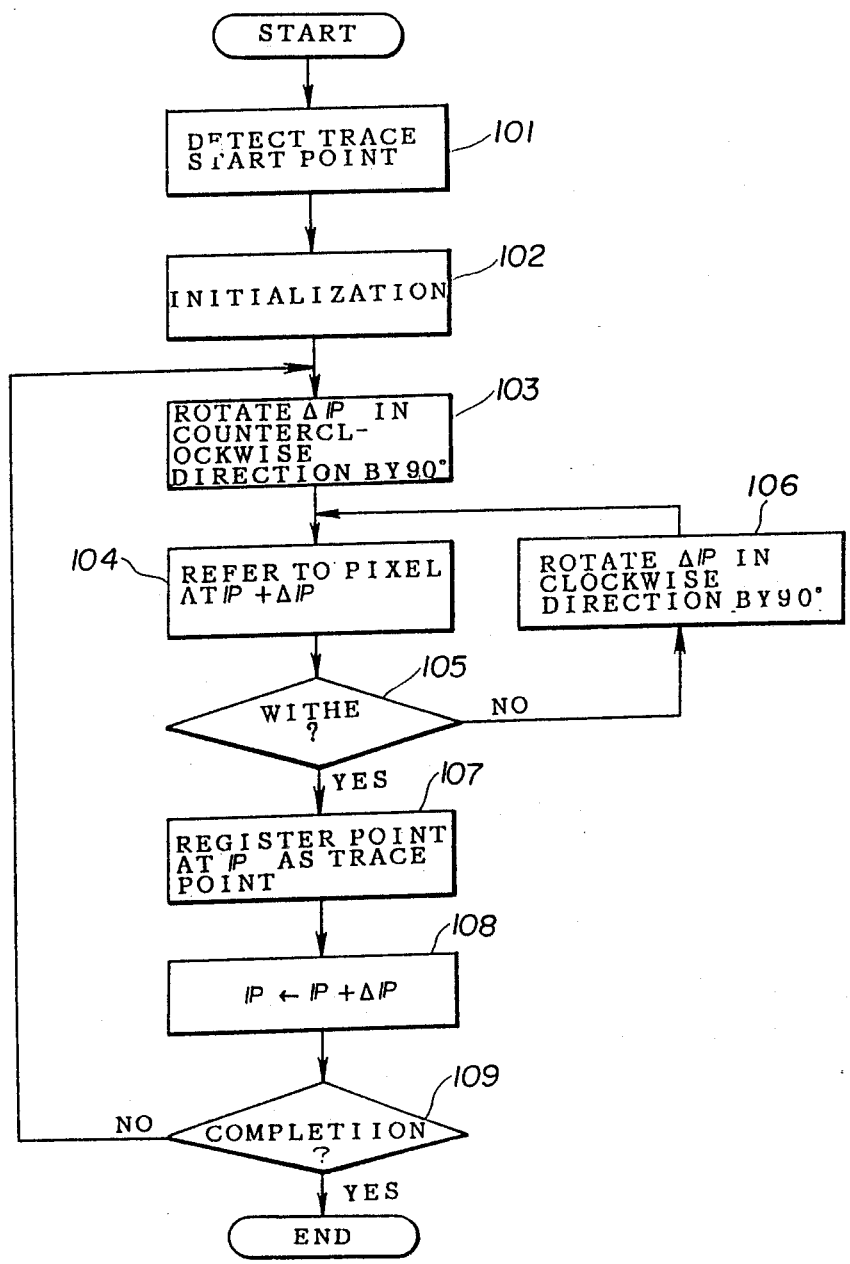
FIG. 2 is a flow chart of a first example of a contour tracing process provided by the present invention.

Referring to FIG. 2, a binary image is raster-scanned and a first white pixel immediately followed by a black pixel in the scanning direction is detected (step 101 in FIG. 2). Then, a vector P+Δ P with respect to the above first white pixel which is the start point from which the tracing process starts is set to an initial value (step 102). At this time, the vector P is designated as the position (coordinates) of the start point, and the unit vector Δ P is designated as the unit vector having a direction opposite the scanning direction.

Figure 3:
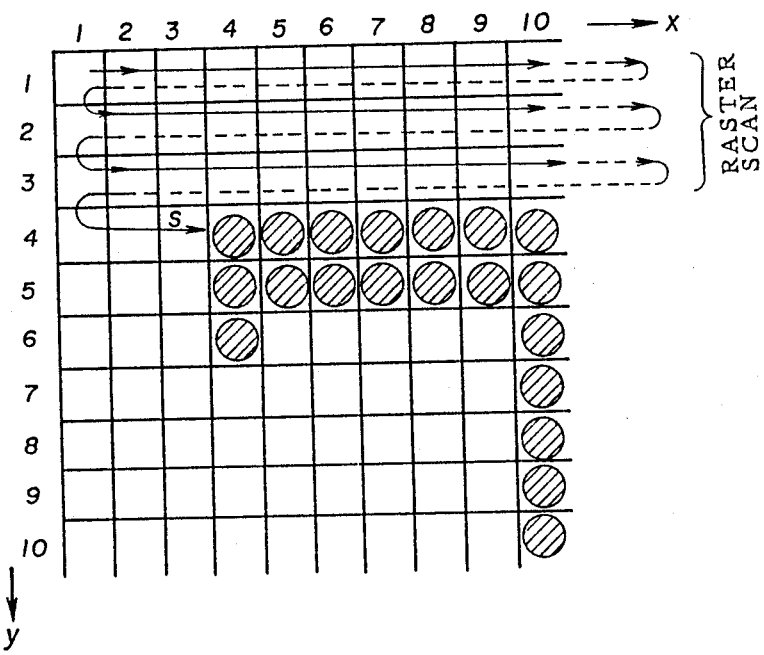
FIG. 3 is a view for explaining a start point from which the contour tracing process starts.

FIG. 3 is a view for explaining the initialization of the vector P and Δ P in detail. In this figure, hatched circles denote black pixels, and numerals aligned along the x and y directions denote coordinates. Further, arrows indicate a direction of the raster scan. In the example illustrated, a white pixel indicated by S is a first scanned white pixel immediately followed by a black pixel in the raster scanning direction. Therefore, the white pixel indicated by S is designated as the start point. The position vector of the white pixel S is represented as P=(3, 4). The raster-scanning direction at the start point is the right-hand direction. Therefore, the unit vector Δ P to be added to the position vector P of the start point is a unit vector having a direction opposing the scanning direction. That is, Δ P=(−1, 0).

After the tracing of the contour of the binary image has begun, the movement from the point of interest (which is the initial start pixel) to the next trace point is carried out as follows. Four adjacent pixels positioned on upper, lower, left-hand and right-hand sides of the point of interest are sequentially checked in the clockwise direction starting from one adjacent pixel which is positioned on the left-hand side at an angle of 90° with respect to a direction in which the trace proceeded towards the point of interest. In this checking operation, if the first checked pixel, i.e., the adjacent pixel positioned on the left-hand side at an angle of 90° with respect to the direction in which the trace reached the point of interest is a white pixel, the trace immediately moves to this point. Alternatively, if the first checked pixel is a black pixel, the next or second adjacent pixel in the clockwise direction is checked. If this pixel is a white pixel the trace moves thereto, and alternatively if not, the third adjacent pixel is checked. In this manner, the adjacent pixels are sequentially checked, and the first white pixel is detected.

The above processes correspond to a sequence of steps 103 to 107 in FIG. 2. At step 103, the unit vector ΔP is rotated in the counterclockwise direction by an angle of 90°. Then, a pixel represented by the vector P+ΔP is referred to and checked as to whether or not it is a white pixel (steps 104 and 105). If the result is affirmative, the process proceeds to step 107 at which the pixel indicated by the vector P is registered as the trace point. Alternatively, if the result is negative, the process proceeds to step 106 at which the unit vector ΔP is rotated in the clockwise direction by an angle of 90°. Then, step 104 and a subsequent step 105 are carried out. In this manner, the trace point subsequent to the point of interest is designated and registered. In the following description, registration of a trace point means that a pixel of the trace point and its address are registered. Subsequent to step 107, the current vector P+ΔP is inserted into the vector P (step 108). Then, it is checked as to whether or not the tracing process of the contour of the binary image is completed (step 109). If the tracing process is not completed, the tracing process returns to step 103 and the sequence of steps 103 to 109 is repeated in the manner described above. Alternatively, if the tracing returns to the start point, it is completed.

Figure 4A:
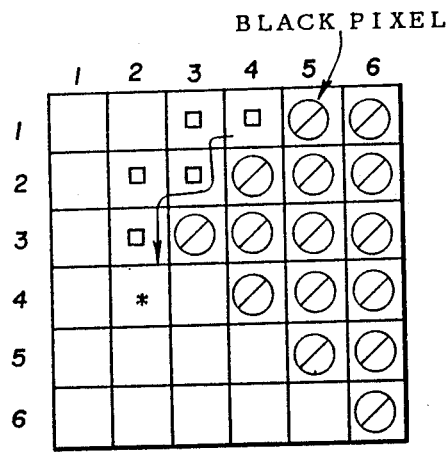
FIGS. 4A through 4C are views showing a detailed example of the contour tracing process of the first example.
Figure 4B:
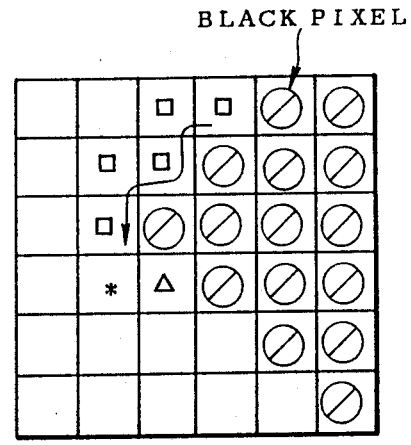
Figure 4C:
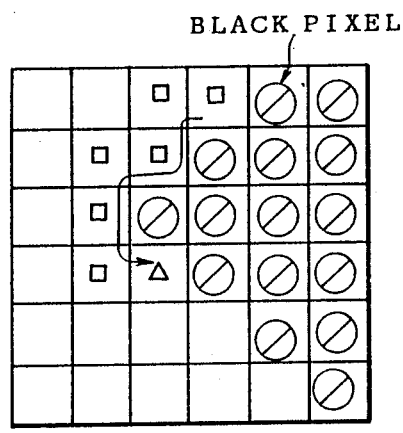

A concrete example of the above contour tracing process is shown in FIGS. 4A through 4C. FIG. 4A shows a state immediately before step 103 is carried out. A symbol □ denotes a registered trace point. In the state shown in FIG. 4A, the pixel of interest P=P+ΔP at a position indicated by a symbol * is represented as P=(2, 3) and ΔP=(0, 1). This corresponds to step 108 shown in FIG. 3. With respect to this point of interest, the unit vector ΔP is rotated in the counterclockwise direction by 90° (step 103), so that ΔP=(1, 0) (right-hand direction). Then, a pixel at P+ΔP in which P=(2, 3) and ΔP=(1, 0) is referred to (step 104). This pixel is located at a position of a symbol Δ shown in FIG. 4B. Then, it is checked whether or not the pixel designated at step 104 is a white pixel (step 105). In the illustrated example, the pixel at the position Δ is a white pixel. Therefore, the point of interest indicated by the symbol * is registered as the trace point (step 107). Then, the point of interest shifts to the position Δ (step 108). At this time, P=(2, 4) and ΔP=(1, 0) (left-hand direction).

EXAMPLE 2

In example 2, the contour of the binary image is traced in the clockwise direction along white pixels. A flow chart of the contour tracing process of this example is shown as FIG. 5.

In this figure, step 201 of designating a trace start point and step 202 for the initialization correspond to steps 101 and 102 shown in FIG. 2. Thereafter, the movement from the point of interest to the next trace point is carried out as follows. The unit vector ΔP is rotated in the clockwise direction by an angle of 90° (step 203). Then, a pixel at P=P+ΔP is referred to and checked (steps 204 and 205). If this pixel is a white pixel at step 205, this pixel is registered as the trace point at step 207. If step 205 is negative, the unit vector ΔP is rotated in the counterclockwise direction by 90° (step 206), and the sequence of steps 204 and 205 is performed again. Then, the first white pixel detected by the counterclockwise checking process is detected and registered (step 207). Thereafter, the vector P+ΔP is inserted into the vector P (step 208), and the contour tracing process returns to step 203 if not completed (step 209).

Figure 5:
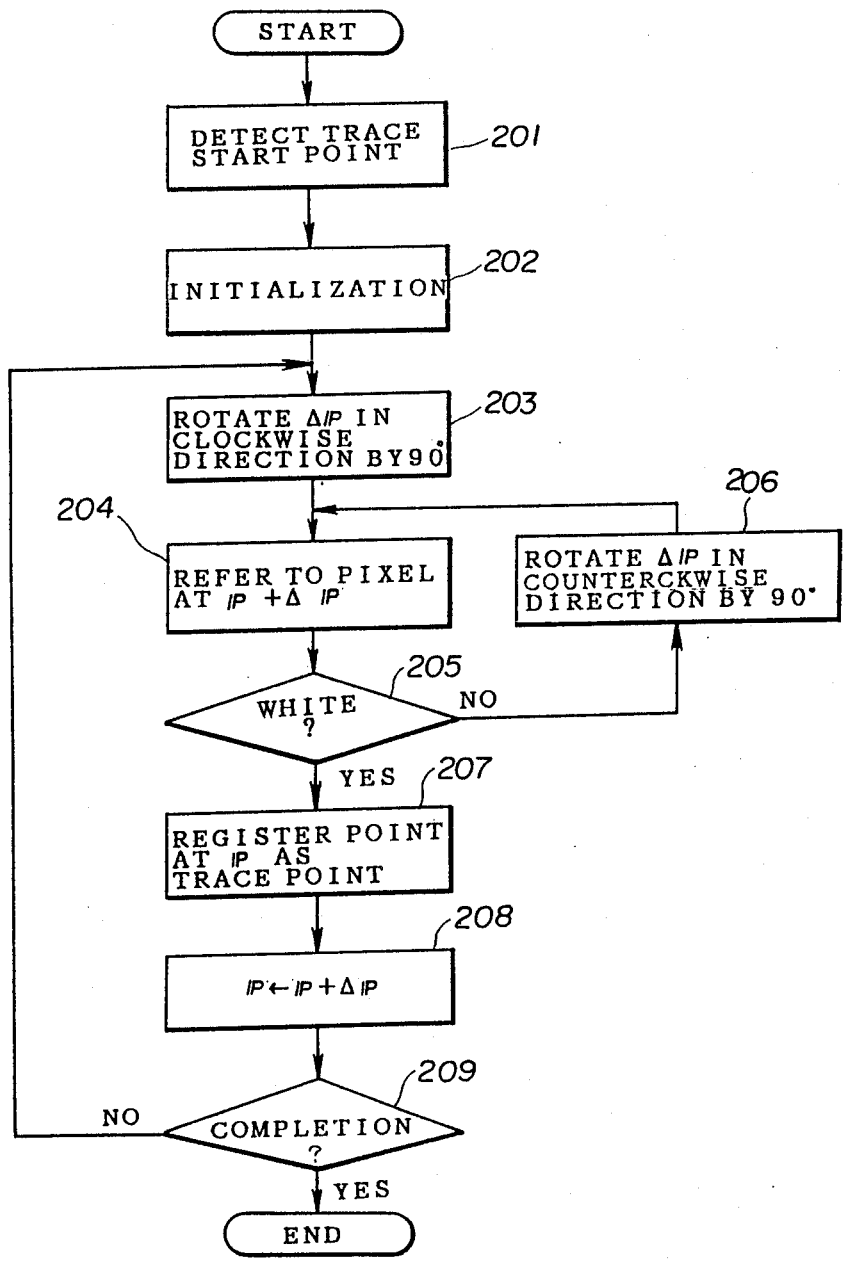
FIG. 5 is a flow chart of a second example of the contour tracing process provided by the present invention.
Figure 6A:
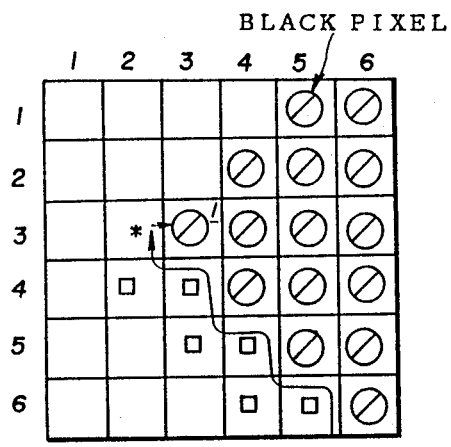
FIGS. 6A through 6D are views showing a detailed example of the contour tracing process of the second example.
Figure 6B:
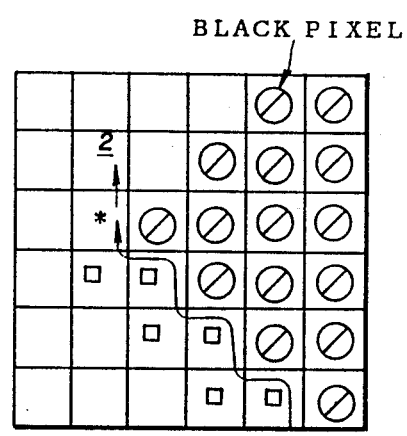
Figure 6C:
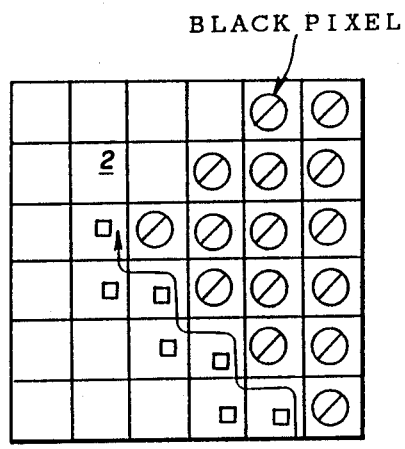
Figure 6D:
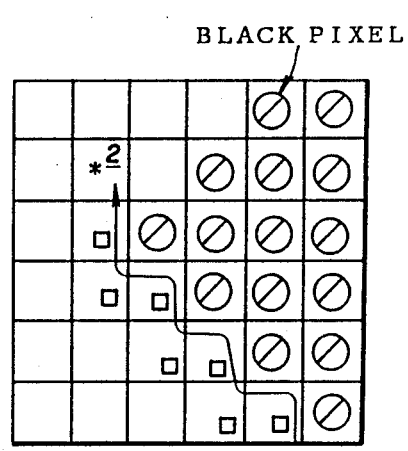

A concrete example is shown in FIGS. 6A through 6D. FIG. 6A shows a state where step 203 is about to be carried out. A symbol □ denotes a registered trace point. In the state shown in FIG. 6A, the point of interest at a position designated by a symbol * is represented as P=(2, 3) and the unit vector extending to the point of interest is represented as ΔP=(0, 1) (lower direction). These vectors are designated in accordance with step 208 shown in FIG. 5. With respect to the above point of interest, the unit vector ΔP is rotated in the clockwise direction by 90° (step 203), so that ΔP=(1, 0) (right-hand direction). Then, a pixel at P+ΔP (position 1) where P=(2, 3) and ΔP=(1, 0) is referred to (step 204). Then, it is checked whether or not this pixel is a white pixel (step 205). In the illustrated example, the pixel at the position 1 is a black pixel. Therefore, the unit vector ΔP is rotated in the counterclockwise direction by 90° (step 206) as shown in FIG. 6B, and a pixel at a position 2 where P=(2, 3) and ΔP=(0, −1) (upper direction) is referred to (step 204) and checked as to whether or not it is a white pixel (step 205). In the illustrated example, the pixel at the position 2 is a white pixel. Therefore, the point of interest (pixel) at the position * is registered (step 207) as shown in FIG. 6C, in which the symbol * in FIGS. 6A and 6B is replaced with the symbol □, which denotes the registered trace point. Thereafter, the point of interest is shifted to the position 2, as shown in FIG. 6D.

EXAMPLE 3

This is a modification of the example 1 described previously. In example 3, the contour of the binary image is traced in the counterclockwise direction along white pixels, while coping with noise.

Figure 7:
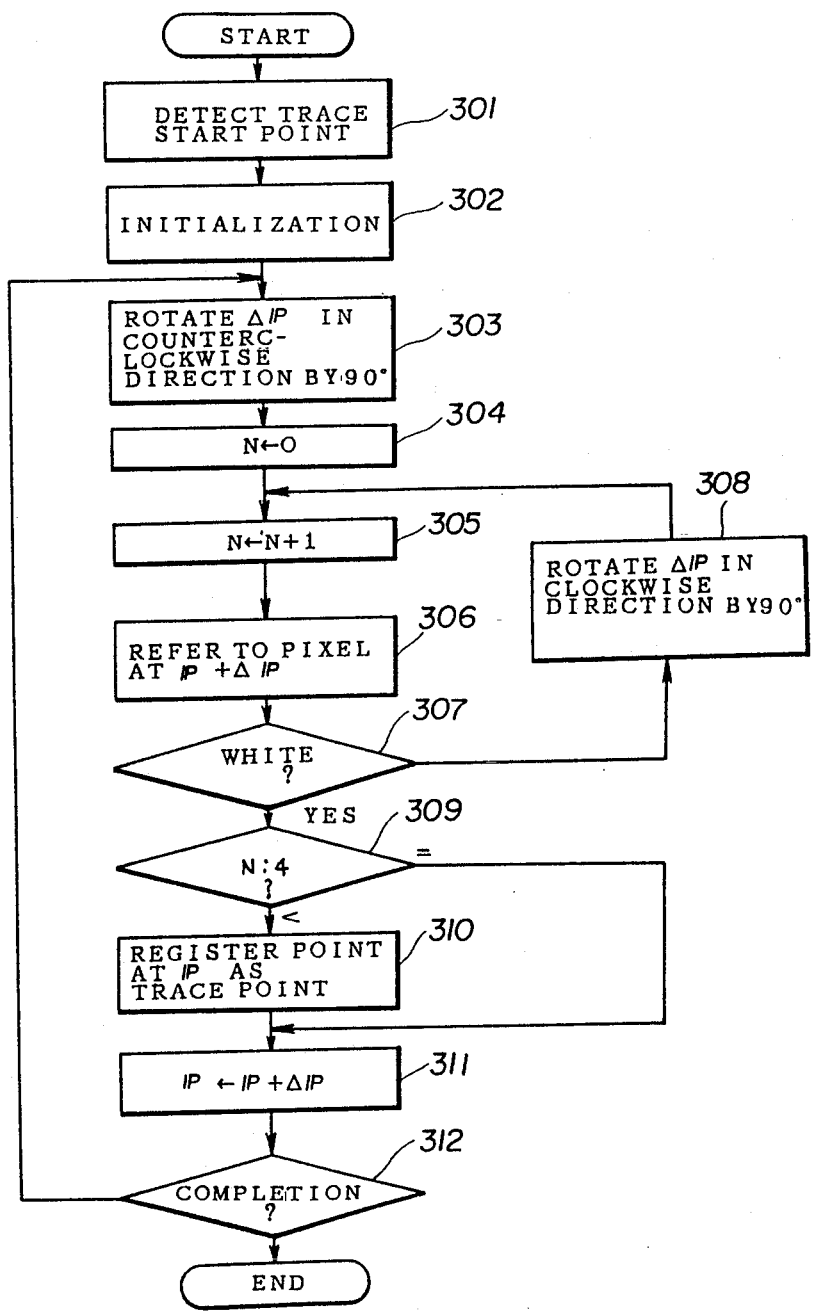
FIG. 7 is a flow chart of a third example of the contour tracing process provided by the present invention.

FIG. 7 is a flow chart showing a sequence of the contour tracing method of the example 3. The sequence shown in FIG. 7 differs from that shown in FIG. 2 in that the following process is added to the sequence in FIG. 2. This added process is such that at the time of checking the four adjacent pixels, when a white pixel is first detected at the fourth check, this white pixel is decided to be a noise and is not registered as the trace point. For this purpose, there is provided a counter N for counting a number of times the checking routine was repeated.

After processing steps 301 to 303 corresponding to steps 101 to 103 in FIG. 2, a value of 0 is set in the counter N (step 304). Next, the count value of the counter N is incremented by 1 (step 305). Then, it is checked whether or not the first checked adjacent pixel is a white pixel (steps 306 and 307). If this pixel is not a white pixel, the unit vector ΔP is rotated in the clockwise direction by 90° (step 308). Then, after the count value of the counter N is incremented by 1 (in this case, the count value becomes equal to 2) at step 305, the sequence of steps 306 and 307 is carried out again. In this manner, the adjacent pixels are sequentially checked. When the first white pixel is detected, it is checked whether or not the current value of the counter N is equal to 4 (step 309). If the current value of the counter N is not equal to 4, the point of interest is registered as the trace point (step 310), and the next point of interest is designated (step 311). Alternatively, if the result at step 309 is affirmative, the process jumps to step 311. That is, since the sequential check was repeated four times, the point of interest is concluded to be a noise and is not registered.

Figure 8A:
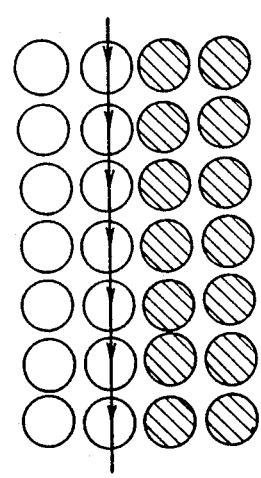
FIGS. 8A and 8B are view showing detailed examples of the contour tracing process of the third example.
Figure 8B:
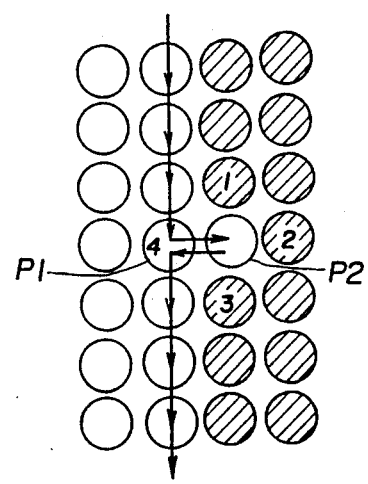

FIGS. 8A and 8B are views showing examples for explaining the tracing process of the example 3. FIG. 8A is an example in which there is no noise, and FIG. 8B is an example in which there is noise. The tracing process shown in FIG. 8A would be easily understood from the previous explanation associated with FIG. 2. Therefore, an explanation thereof is omitted.

Referring to FIG. 8B, it is now assumed that a position of a pixel P2 is the point of interest. First of all, with respect to the pixel P2 at the point of interest, an adjacent pixel is checked which is positioned on the left-hand side of the pixel P2 at an angle of 90° with respect to the direction in which the trace proceeded towards the point of interest (steps 306 and 307). At this time, the count value of the counter N is 1 (step 305). In the illustrated example, the first checked pixel is a black pixel. Therefore, the unit vector ΔP is rotated in the clockwise direction by an angle of 90° (step 308), and the sequence of steps 305 to 307 is repeated. In the example, the secondly and thirdly checked pixels are both black pixels. On the other hand, the pixel at the last (fourth) check is a white pixel. At this time, the count value of the counter N is equal to 4, i.e., the checking process has been repeated four times. Therefore, the pixel P2 is not registered, and the position of the pixel P1 is designated as the next point of interest. As a result, the pixel P2 is neglected as if it were not traced.

EXAMPLE 4

This example is a modification of the example 2 described previously. In example 4, the contour of the binary image is traced in the clockwise direction along white pixels while coping with noise.

Figure 9:
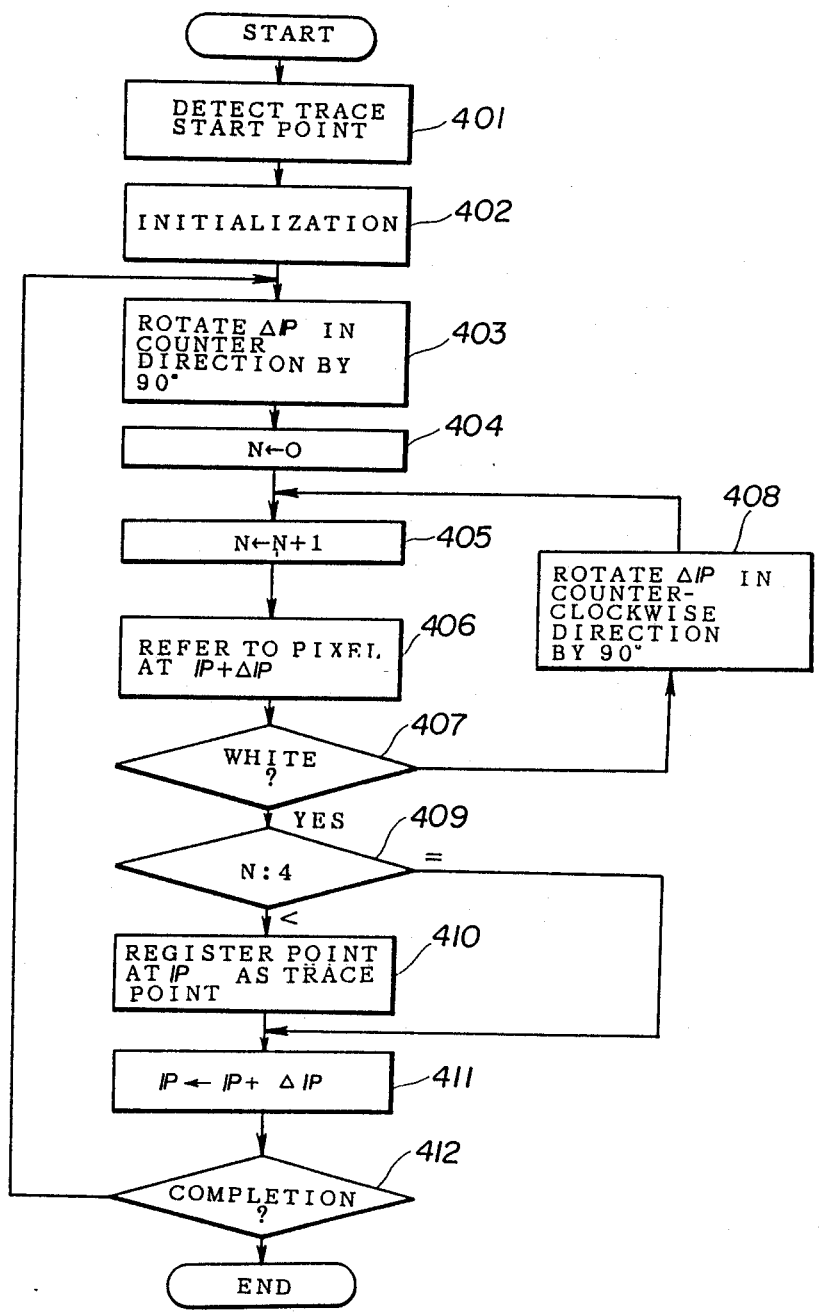
FIG. 9 is a flow chart of a fourth example of the contour tracing process provided by the present invention

FIG. 9 is a flow chart of a contour tracing process of the example 4. A basic process of the example 4 corresponds to the process of the example 2, and a noise process of the example 4 corresponds to that of the example 3.

After processing steps 401 to 403 corresponding to steps 201 to 203 in FIG. 5, a value of 0 is set in the counter N (step 404). Next, the count value of the counter N is incremented by 1 (step 405). Then, it is checked whether or not the first checked adjacent pixel is a white pixel (steps 406 and 407). If this pixel is not a white pixel, the unit vector ΔP is rotated in the counterclockwise direction by 90° (step 408). Then, after the counter N is incremented by 1 (i.e., the count value becomes equal to 2) at step 405, the sequence of steps 406 and 407 is carried out again. In this manner, the adjacent pixels are checked. When the first white pixel is detected, it is checked whether or not the current value of the counter N is equal to 4 (step 409). If the current value of the counter N is not equal to 4, the point of interest is registered as the trace point (step 410), and the next point of interest is designated (step 411). Alternatively, if the result at step 409 is affirmative, the process jumps to step 411. That is, since the sequential check was repeated four times, the point of interest is concluded to be a noise and is therefore not registered.

Figure 10A:
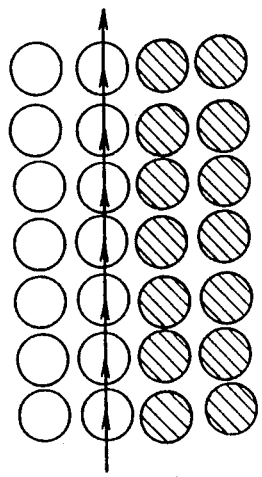
FIGS. 10A and 10B are views showing detailed examples of the contour tracing process of the fourth example.
Figure 10B:
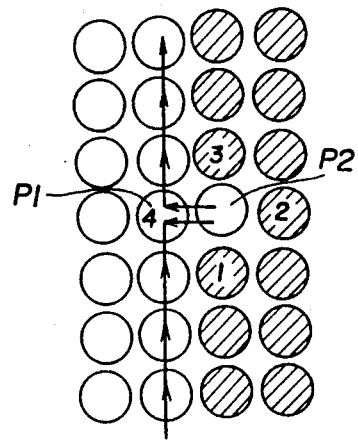

FIGS. 10A and 10B are views showing examples for explaining the tracing process of the example 4. FIG. 10A is an example in which no noise exists, and FIG. 10B is an example in which a noise exists. The tracing process shown in FIG. 10A would be easily understood from the explanation associated with FIG. 5. Therefore, an explanation thereof is omitted.

Referring to FIG. 10B, it is now assumed that a position of a pixel P2 is the point of interest. First of all, with respect to the pixel P2 at the point of interest, an adjacent pixel is checked which is positioned on the right-hand side of the pixel P2 at an angle of 90° with respect to the direction in which the trace proceeded towards the point of interest (steps 406 and 407). At this time, the count value of the counter N is 1 (step 405). In the illustrated example, the first checked pixel is a black pixel. Therefore, the unit vector ΔP is rotated in the counterclockwise direction by an angle of 90° (step 408), and the sequence of steps 405 to 407 is carried out again. In the example, the secondly and thirdly checked pixels are both black pixels. On the other hand, the pixel checked by the last check is a white pixel. At this time, the count value of the counter N is equal to 4, i.e., the checking process has already been repeated four times. Therefore, the pixel P2 is not registered and the position of the pixel P1 is designated as the next point of interest. As a result, the pixel P2 is neglected as if it were not traced.

EXAMPLE 5

Figure 11:
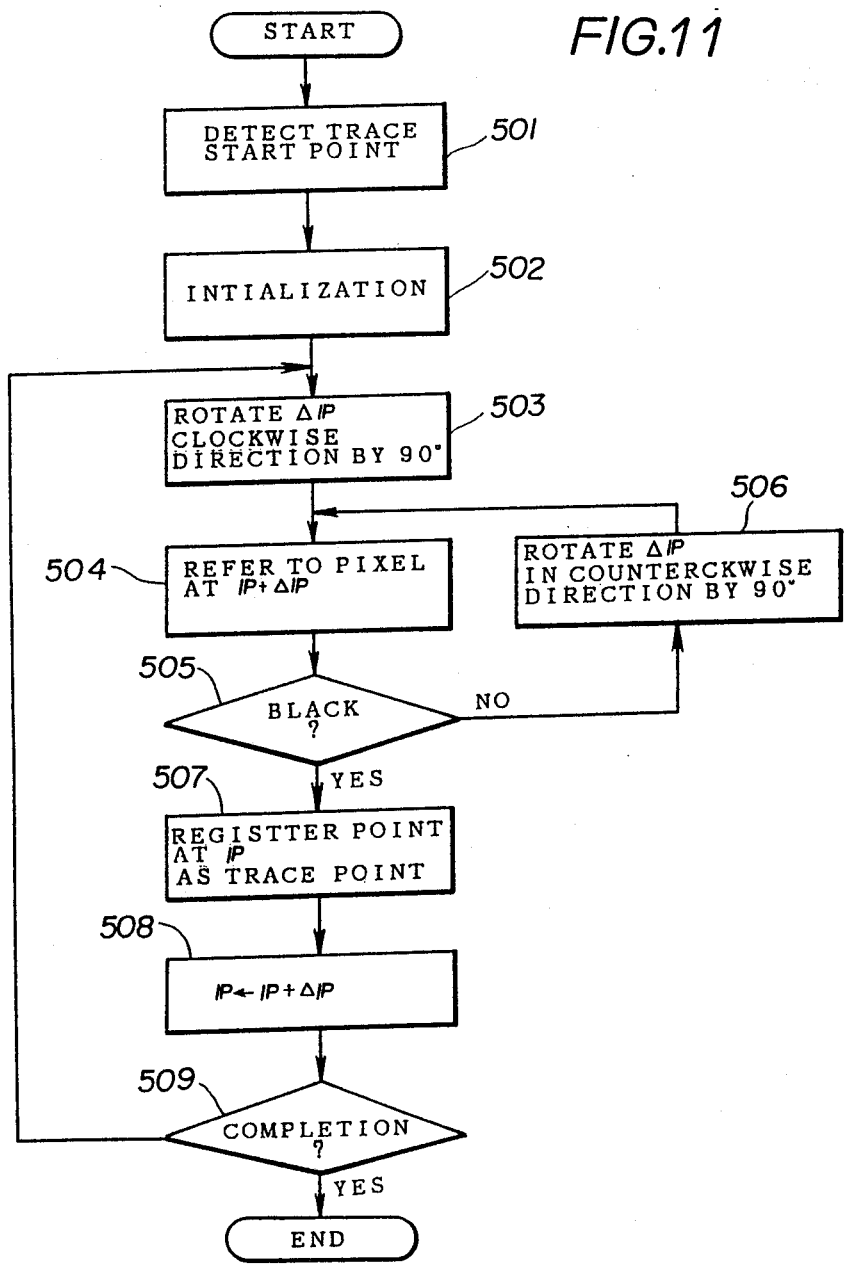
FIG. 11 is a flow chart of a fifth example of the contour tracing process provided by the present invention.

This is an example of tracing the contour of the binary image in the counterclockwise direction along black pixels. FIG. 11 is a flow chart of a contour tracing process of this example.

The start point from which the tracing process starts is a black pixel subsequent to a white pixel which is first found in the raster scan (step 501). First, an initialization is carried out (step 502). At the initialization step, the position vector P is set to the position of the start pixel and the unit vector ΔP is set to a unit value having a direction identical to the scanning direction.

Figure 12:
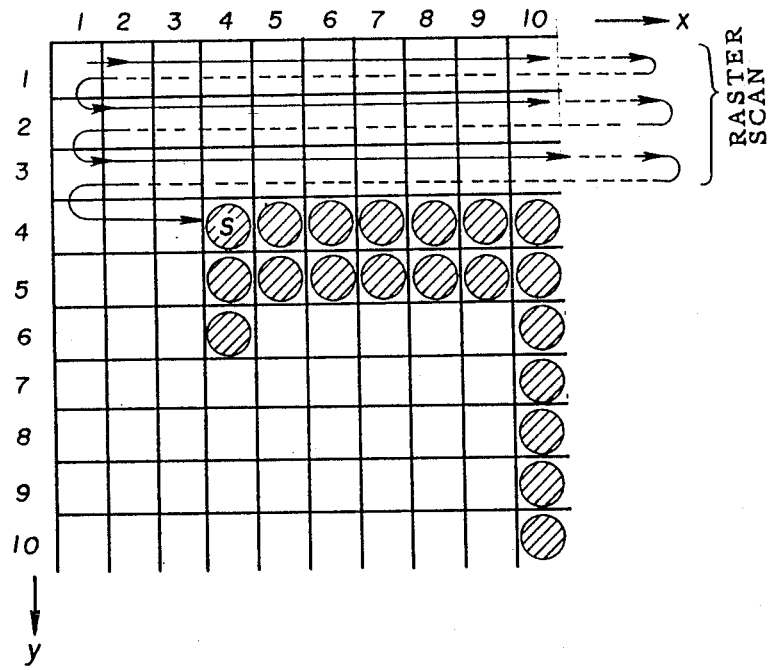
FIG. 12 is a view for explaining designation of the start point from which the contour tracing process starts.

FIG. 12 is a view for explaining the initialization. In this figure, a black pixel indicated by S is the start point from which the contour tracing process starts. In this case, the start pixel P=(4, 4). The unit vector ΔP with regard to the start pixel is represented as ΔP=(1, 0).

After starting the tracing process, the next trace pixel following the start pixel is designated as follows. First, four adjacent pixels with respect to the point of interest (which is the start point at the commencement of the tracing) are sequentially checked in the counterclockwise direction starting from one pixel out of the four adjacent pixels which is positioned on the right-hand side at an angle of 90° with respect to a moving direction in which the trace proceeded towards the point of interest. In this checking process, if the first checked pixel is a black pixel, the trace immediately proceeds to that black pixel. If not, the next adjacent pixel in the counterclockwise checking process is checked. In this manner, the first black pixel is detected. This counterclockwise checking process is carried out in accordance with steps 503 to 507. After the first black pixel is registered at step 507, the vector P+ΔP at step 504 is set to the vector P (step 508). Then, it is checked whether or not the tracing process is completed (step 509). If the result at step 509 is negative, the tracing process proceeds to step 503.

The contour tracing process of the example 5 is described in more detail with reference to a concrete example shown in FIGS. 13A through 13D.

Figure 13A:
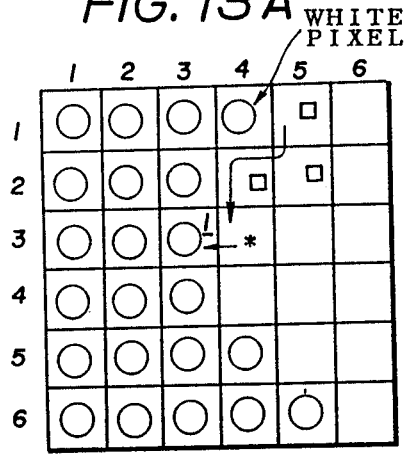
FIGS. 13A through 13D are views showing a concrete example of the contour tracing process of the fifth example.
Figure 13B:
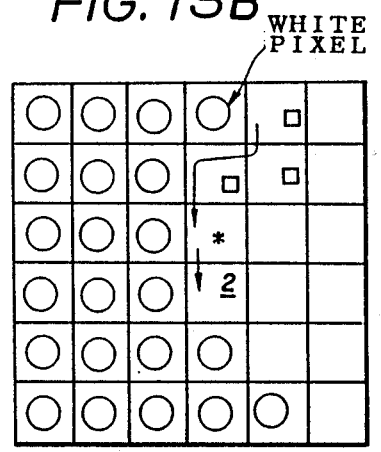
Figure 13C:
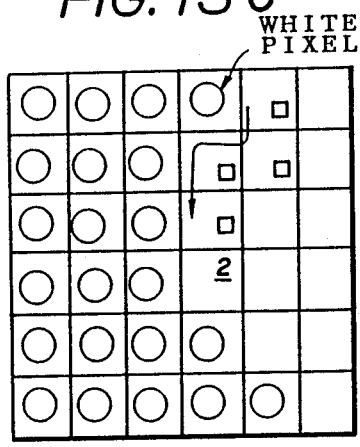
Figure 13D:
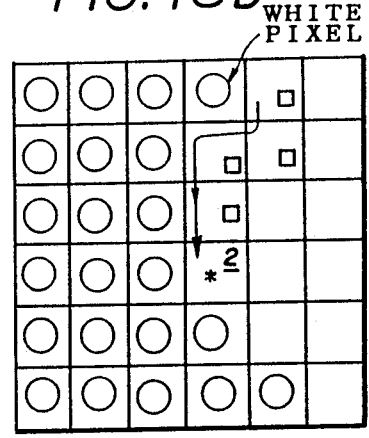

FIG. 13A shows a state immediately before step 503 shown in FIG. 11 is carried out. In this state, the position vector P indicates a position * of the point of interest, and the unit vector ΔP extending from the point of interest * is represented as ΔP=(0, 1) (lower direction). Then, the unit vector ΔP is rotated in the clockwise direction by an angle of 90° (step 503), and a pixel at a position 1 is referred to (step 504). Then, it is checked whether or not the pixel at the position 1 is a black pixel (step 505). In the illustrated example, this pixel is a white pixel. Therefore, the unit vector ΔP is rotated in the counterclockwise direction by an angle of 90° (step 506), and a pixel at a position 2 shown in FIG. 13B is checked whether or not it is a black pixel (steps 504 and 505). In the example, since the pixel at the position 2 is a black pixel, the point of interest indicated by the symbol * is registered as the trace point (step 507). A state at this time is shown in FIG. 13C. Then, the next point of interest 2 is designated as shown in FIG. 13D (step 508).

EXAMPLE 6

Figure 14:
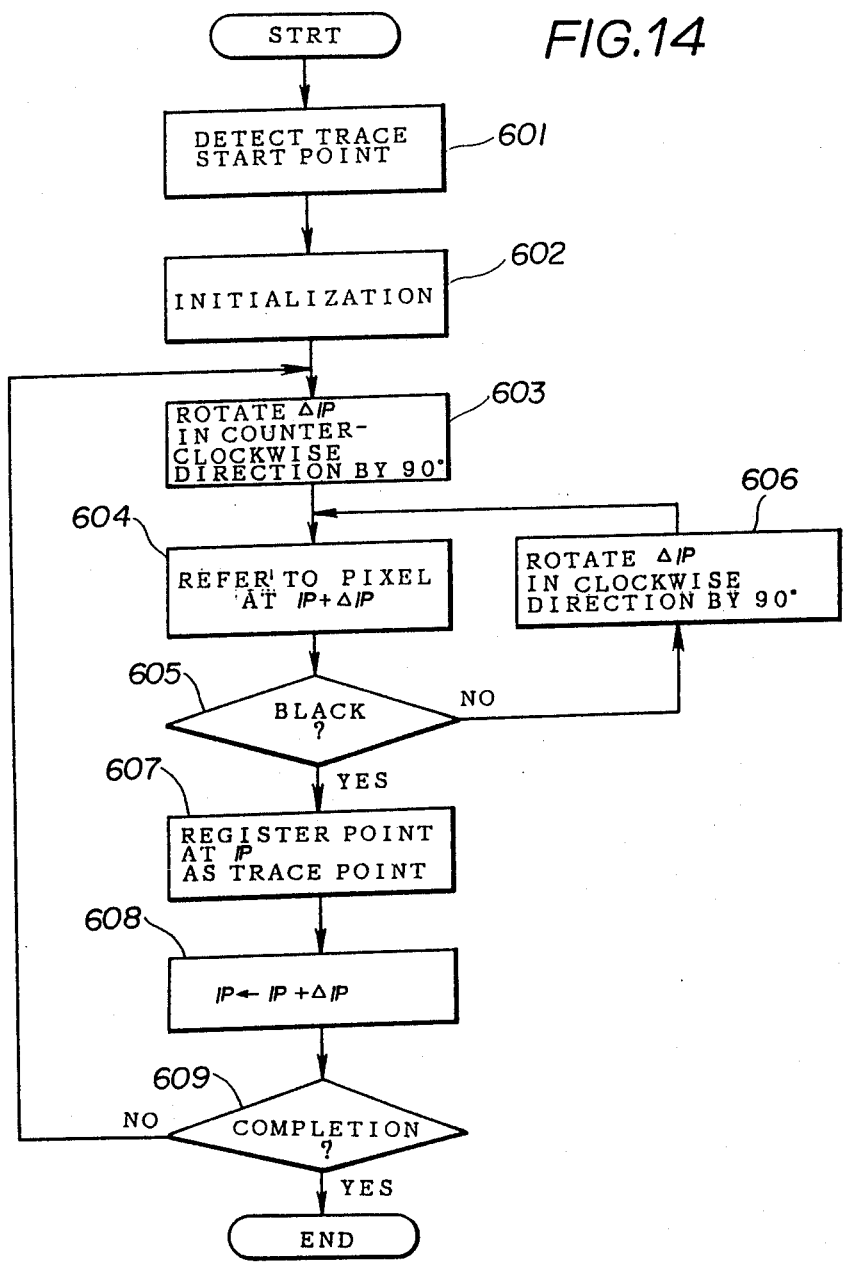
FIG. 14 is a flow chart of a sixth example of the contour tracing process provided by the present invention.

In example 6, the contour of the binary image is traced in the clockwise direction along black pixels. FIG. 14 is a flow chart of a contour tracing process of this example.

In this figure, steps 601 and 602 coincide with steps 501 and 502 shown in FIG. 11, respectively. After starting the tracing process, a next trace point with respect to a point of interest is designated as follows. Four adjacent pixels with regard to the point of interest are checked in the clockwise direction starting from one adjacent pixel out of the four adjacent pixels which is positioned on the lift-hand side at an angle of 90° with respect to a moving direction in which the trace proceeded towards the point of interest. At this time, if the first checked pixel is a black pixel, the trace immediately moves to that black pixel. If not, the pixel subsequent to the first checked pixel in the clockwise checking process is checked. This checking process is carried out until a black pixel is detected.

Figure 15A:
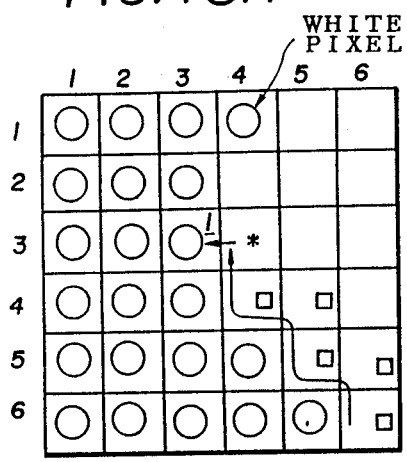
FIGS. 15A through 15D are views showing a concrete example of the contour tracing process of the sixth example.
Figure 15B:
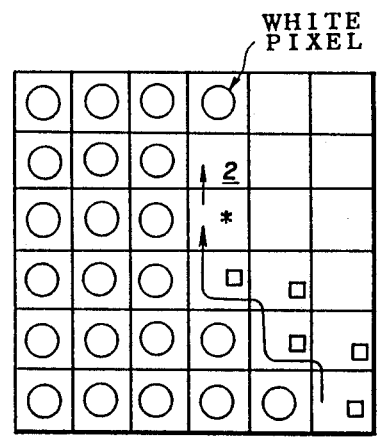
Figure 15C:
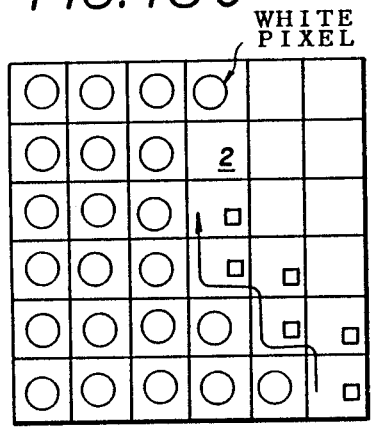
Figure 15D:
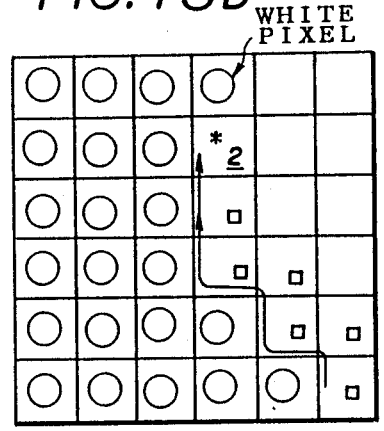

The tracing process of the example 6 is described in more detail with reference to a concrete example shown in FIGS. 15A through 15D. FIG. 15A is a state just prior to step 603. In this state, the position vector P is at a position indicated by a symbol *, and the unit vector ΔP is represented as ΔP=(0, 1) (lower direction). With regard to the point of interest, the unit vector ΔP is rotated in the counterclockwise direction by an angle of 90° (step 603), and a pixel at a position 1 is referred to (step 604). Then, the pixel at the position 1 is checked as to whether or not this pixel is a black pixel (step 605). In the illustrated example, the pixel at the position 1 is a white pixel. Therefore, the unit vector ΔP extending to the point of interest is rotated in the clockwise direction by an angle of 90° (step 606). Then, a pixel at a position 2 indicated by the rotation of the unit vector is referred to and checked (steps 604 and 605). In the example, the pixel at the position 2 is a black pixel. Therefore, the pixel at the position 2 is registered as the trace point (step 607). This state is shown in FIG. 15C. Then, the next point of interest is shifted to the position 2 (step 608). This state is shown in FIG. 15D.

EXAMPLE 7

This example is a modification of the example 5 and traces the contour of the binary image in the counterclockwise direction along black pixels, while coping with noise.

Figure 16:
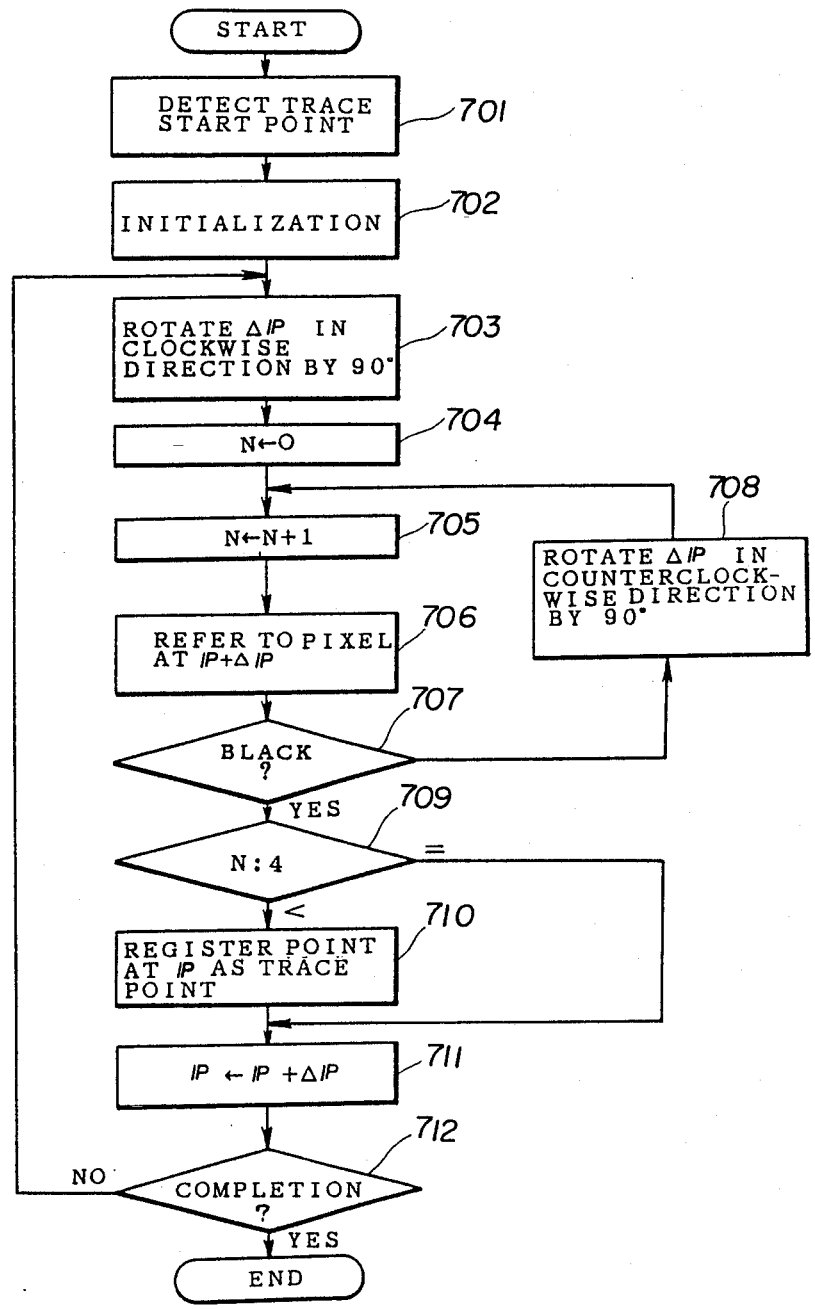
FIG. 16 is a flow chart of a seventh example of the contour tracing process provided by the present invention.

FIG. 16 is a flow chart showing a contour tracing process of the example 7. A basic tracing process is the same as the tracing process of the example shown in FIG. 11. The sequence shown in FIG. 16 differs from that shown in FIG. 11 in that the following process is added to the sequence in FIG. 11. The added sequence is such that at the time of checking the four adjacent pixels, when a black pixel is first detected at the last or fourth checking process, this black pixel is concluded to be a noise and is not registered. For this purpose, as in the case of FIG. 17, there is provided the counter N for counting the number of times the checking process was repeated.

After processing steps 701 to 703 corresponding to steps 501 to 503 in FIG. 11, a value 0 is set in the counter N (step 704). Next, the counter N is incremented by 1 (step 705). Then, it is checked whether or not the adjacent pixel designated at step 703 is a black pixel (steps 706 and 707). If this pixel is not a black pixel, the unit vector ΔP is rotated in the counterclockwise direction by 90° (step 708). Then, after the count value of the counter N is incremented by 1 (i.e., the current value becomes equal to 2) at step 705, the sequence of steps 706 and 707 is carried out again. In this manner, the remaining adjacent pixels are sequentially checked.

When a black pixel is first detected, it is checked whether or not the current value of the counter N is equal to 4 (step 709). If the current value of the counter N is not equal to 4, the corresponding black pixel is registered (step 710), and the next point of interest is designated (step 711). Alternatively, if the result at step 709 is affirmative, the process jumps to step 711. That is, the fourthly checked pixel, which is a black pixel, is not registered and is neglected as a noise.

Figure 17A:
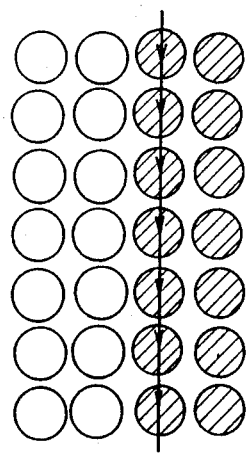
FIGS. 17A and 17B are views showing concrete example of the contour tracing process of the seventh example.
Figure 17B:
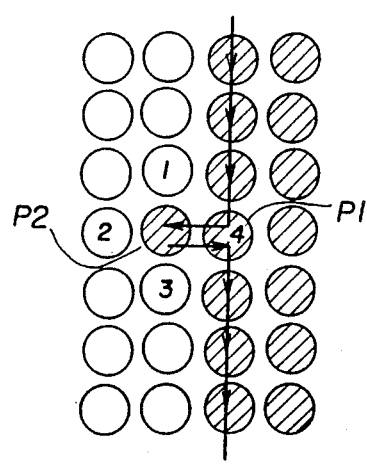

FIGS. 17A and 17B are views showing examples for explaining the tracing process of the example 7. FIG. 17A is an example in which there is no noise, and FIG. 17B is an example in which there is noise. The tracing process shown in FIG. 17A would be easily understood. Therefore, an explanation thereof is omitted.

Referring to FIG. 17B, it is now assumed that a position of a pixel P2 is the point of interest. First of all, with respect to the point of interest, an adjacent pixel is checked which is positioned on the left-hand side of the pixel P2 at an angle of 90° with respect to the direction in which the trace proceeded towards the point of interest (steps 706 and 707). At this time, the count value of the counter N is 1 (step 705). In the illustrated example, the first checked pixel is a white pixel. Therefore, the unit vector ΔP is rotated in the counterclockwise direction by an angle of 90° (step 708), and the sequence of steps 705 to 707 is carried out again. In the example, the secondly and thirdly checked pixels are both white pixels. On the other hand, the fourthly checked pixel is a black pixel. At this time, the count value of the counter N is equal to 4, i.e., the checking process has been repeated four times. Therefore, the pixel P2 is not registered as the trace point, and then the position of the pixel P1 is designated as the next point of interest. As a result, the pixel P2 is neglected as if it were not traced.

EXAMPLE 8

This example is a modification of the example 6 and traces the contour of the binary image in the clockwise direction along black pixels.

Figure 18:
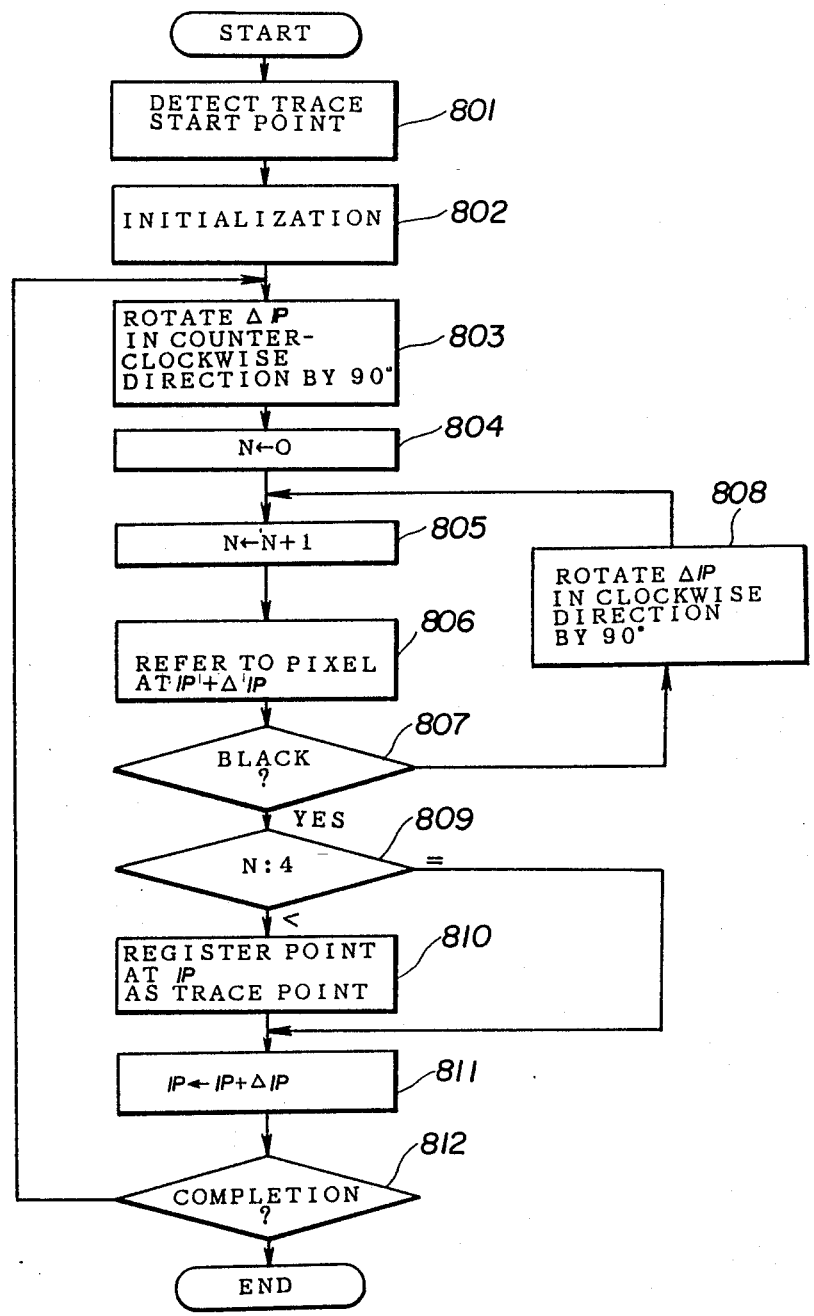
FIG. 18 is a flow chart of an eighth example of the contour tracing process provided by the present invention.

FIG. 18 is a flow chart of a contour tracing sequence of the example 8. A basic process of this example is the same as the tracing process shown in FIG. 14, and the noise processing sequence is the same as that shown in FIG. 16.

Figure 19A:
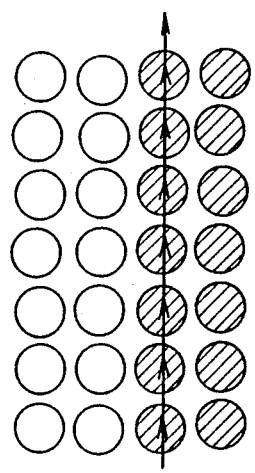
FIGS. 19A and 19B are views showing concrete examples of the contour tracing process of the eighth example.
Figure 19B:
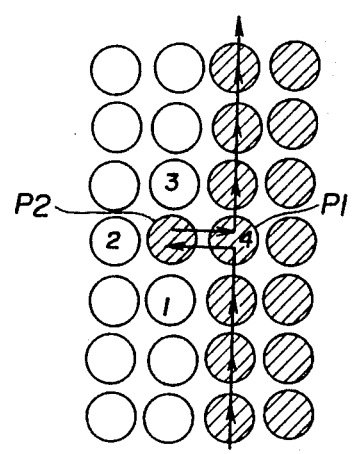

FIGS. 19A and 19B are views showing examples for explaining the tracing process of the example 8. FIG. 19A is an example in which there is no noise, and FIG. 19B is an example in which there is noise. The tracing process shown in FIG. 19A would be easily understood. Therefore, an explanation thereof is omitted.

Referring to FIG. 19B, it is now assumed that a position of a pixel P2 is the point of interest. Firstly, with respect to the pixel P2 at the point of interest, an adjacent pixel is checked which is positioned on the left-hand side of the pixel P2 at an angle of 90° with respect to the direction in which the trace proceeded towards the point of interest (steps 806 and 807). At this time, the count value of the counter N is 1 (step 805). In the illustrated example, the first checked pixel is a white pixel. Therefore, the unit vector ΔP is rotated in the clockwise direction by an angle of 90° (step 808), and the sequence of steps 805 to 807 is carried out again. In the example, the secondly and thirdly checked pixels are both white pixels. Then, the fourthly checked pixel is a black pixel. At this time, the count value of the counter N is equal to 4, i.e., the checking process has been repeated four times. Therefore, the pixel P2 is not registered as the trace point, and the point at the pixel P1 is designated. As a result, the pixel P2 is neglected as if it were not traced.

According to the contour tracing method described above, it is possible to make the process speed higher than that for the conventional process. The reasons are as follows. First, it is not necessary to always refer to all of the adjacent pixels. For example, it is possible to determine the movement of the trace point by referring to only one pixel adjacent to the point of interest. Secondly, it is not necessary to refer to the tables in which the movement of the trace point is defined depending on the combinations of white (or black) pixels adjacent to the center pixel, i.e. the pixel of interest. Moreover, the trace point can be found by rotating the unit vector in the optimized direction. Furthermore, it is possible to obtain a precise and stable contour pattern because abnormal trace points can be eliminated upon the tracing of the contour. In other words, after completing the contour tracing process, a particular process for eliminating bad influence of noise is unnecessary.

A description will be given on an example of a hardware for implementing the above contour tracing process of the present invention, referring to FIG. 20.

An image scanner 10 optically reads characters on a paper or the like and defines a binary image of the character (for example a value "0" for a white pixel and a value "1" for a black pixel). The binary image thus obtained is stored in an original image memory 40. A central processing unit (hereafter referred to as CPU) 20 raster-scans the binary image (original image) stored in the original image memory 40 and detects the start point from which the tracing process starts. Then, the CPU 20 traces the contour of the raster-scanned binary image in the clockwise or counterclockwise direction in accordance with a contour tracing program 31 stored in a program memory 30 of a read only memory (hereafter referred to as ROM). The contour tracing program 31 implements one sequence selected from among the contour tracing processes shown in FIGS. 2, 5, 7, 9, 11, 14, 16 and 18. A traced result is stored in a trace point image memory 50 which has addresses corresponding to addresses associated with the original image memory 40. That is, the content of the trace point image memory 50 indicates a two-dimensional contour image. In a data memory 60 which may be constituted by a random access memory (hereafter referred to as RAM), there are formed a coordinate sequence storing region 61, a start point storing region 62 and a region 63 for storing a number of the trace points. These regions are used for a work memory for the contour tracing process implemented by the CPU 20.

The contour tracing processes described above are applicable to conventional character recognition methods. For example, a feature represented a directional code is assigned to each point (pixel) of the two-dimensional contour image stored in the trace point image storing memory 50, by referring to the tables. Each table defines one feature or directional code associated with the combination of four or eight white and black pixels adjacent to the point of interest. Thereafter, a feature-assigned contour image composed of feature-assigned trace points is divided into a plurality of two-dimensional sub-regions, and a histogram for each two-dimensional sub-region is calculated. Then, the calculated histogram for each sub-region is compared with predetermined reference histograms, and the character is identified. The above processes subsequent to the contour tracing process is described in the U.S. patent application Ser. No. 051,611, which was assigned to the assignee of this application and is incorporated herein by reference. Similarly, the contour tracing process of the present invention can be adapted to conventional character recognition methods other than that disclosed in the above reference.

However, it is preferable to combine the contour tracing process of the present application with a following process for extracting features of the contour (in other words, assigning a feature to each trace point (pixel)), which is provided by the present invention.

A description will be given on a contour feature extracting process provided by the present invention.

The feature extracting process of the present invention is carried out upon tracing the contour of the binary image described previously. In detail, a directional code indicating a moving direction towards the next trace point from the point of interest is assigned to a pixel at the point of interest.

Figures 21A, 21B, 21C:
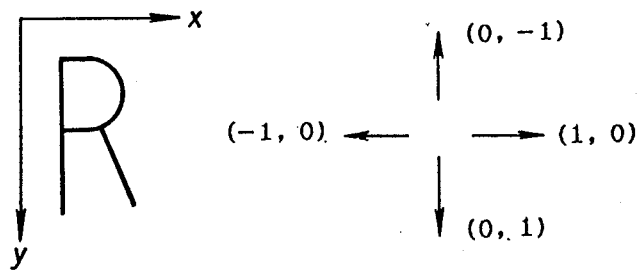
FIGS. 21A through 21C are views for explaining directional codes.

FIGS. 21A through 21C are views for explaining a relationship between a moving direction of a trace point and a directional code. In FIG. 21A, as described previously with reference to FIG. 1A, the x direction indicates the main scanning direction of the raster scan, and the y direction indicates the sub-scanning direction. As described previously with reference to FIG. 1B, when the position (coordinates) of the pixel at the point of interest is considered as the position vector P, a movement towards the next trace point can be expressed by any one of four unit vectors ΔP shown in FIG. 21B. And, the position (coordinates) of the candidates of the next trace point can be represented with the vector P+ΔP obtained by adding the unit vector ΔP to the position vector P. According to the feature extracting process of the present invention, directional codes shown in FIG. 21C are assigned to the four unit vectors ΔP, and the feature of each pixel of the contour is expressed with any one of these directional codes. In FIG. 21C, directional codes '1', '2', '3' and '4' are assigned to the unit vectors (0, 1), (1, 0), (0, −1) and (−1, 0), respectively. A process for assigning the directional code to the trace point is applicable to each of the examples 1 through 8 described previously. A description will be given on examples of the feature extracting process of the present invention.

EXAMPLE 1A

In example 1A, the contour tracing process shown in FIG. 2 described previously is used, in which the contour of the binary image is traced along white pixels in the counterclockwise direction. Directional codes are sequentially assigned to traced white pixels.

Figure 22:
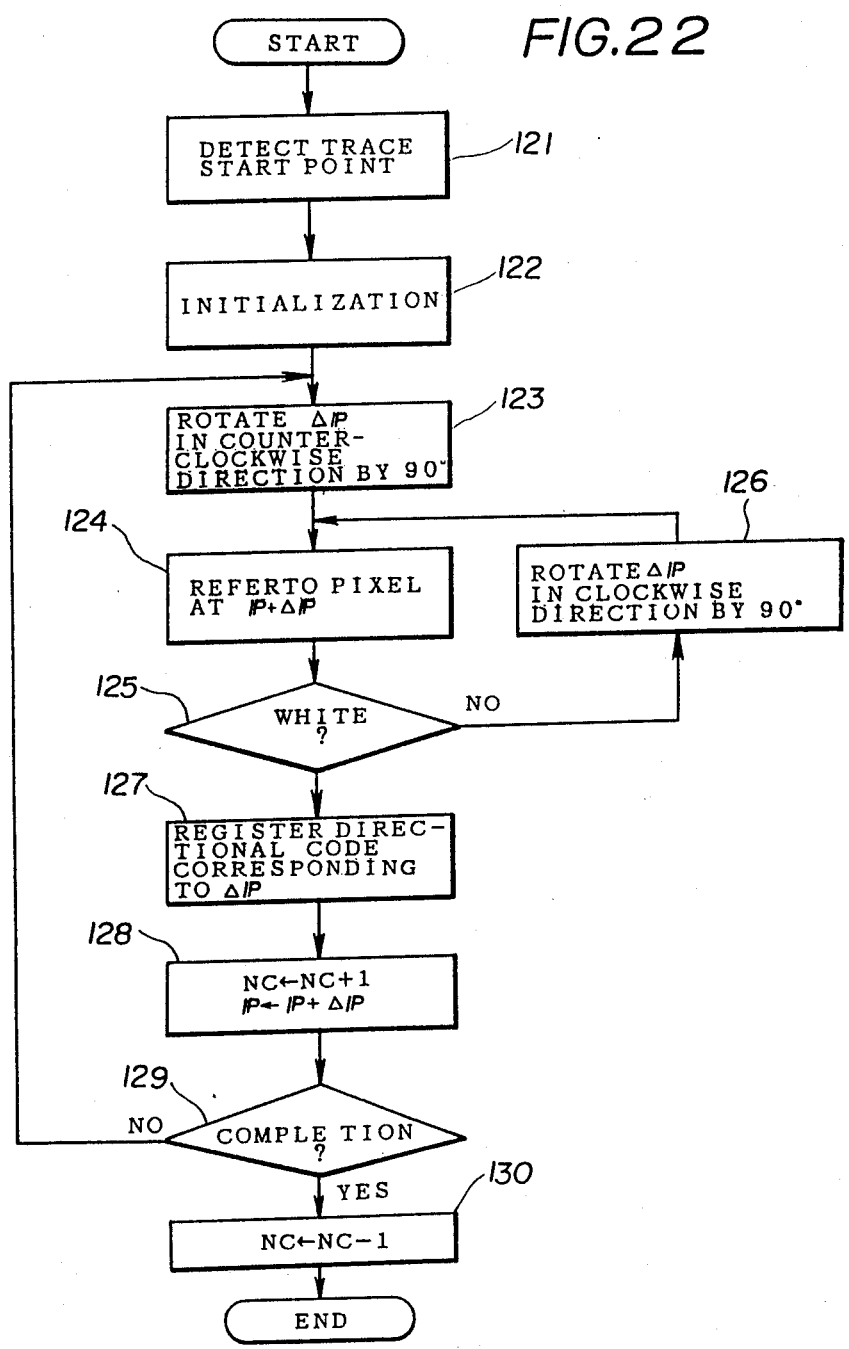
FIG. 22 is a flow chart of a first example of a feature extracting process provided by the present invention.

FIG. 22 is a flow chart of a feature extracting process of the example 1A. In FIG. 22, processes at steps 121 to 126 coincide with steps 101 to 106 shown in FIG. 2, respectively. Differences between these figures are as follows. First, in FIG. 22, when a pixel of P+ΔP at step 124 is designated as the trace point, a directional code corresponding to the unit vector ΔP which indicates the moving direction towards the above trace point is registered in a memory means (step 127). This registration of the directional code is carried out associated with an address provided by an address counter NC. This address counter NC is used for sequentially registering the directional code in the memory means in the form of the one-dimension. Subsequent to step 127, step 128 is executed, in which the count value of the address counter NC is incremented by 1 and the vector P+ΔP is set to P. Then, if the feature extracting process is not completed at step 129, the process returns to step 123, and the process subsequent to step 123 is carried out again. If the process is completed at step 129, the count value of the address counter NC is decremented by 1 (step 130).

Figures 23A, 23B, 23C:
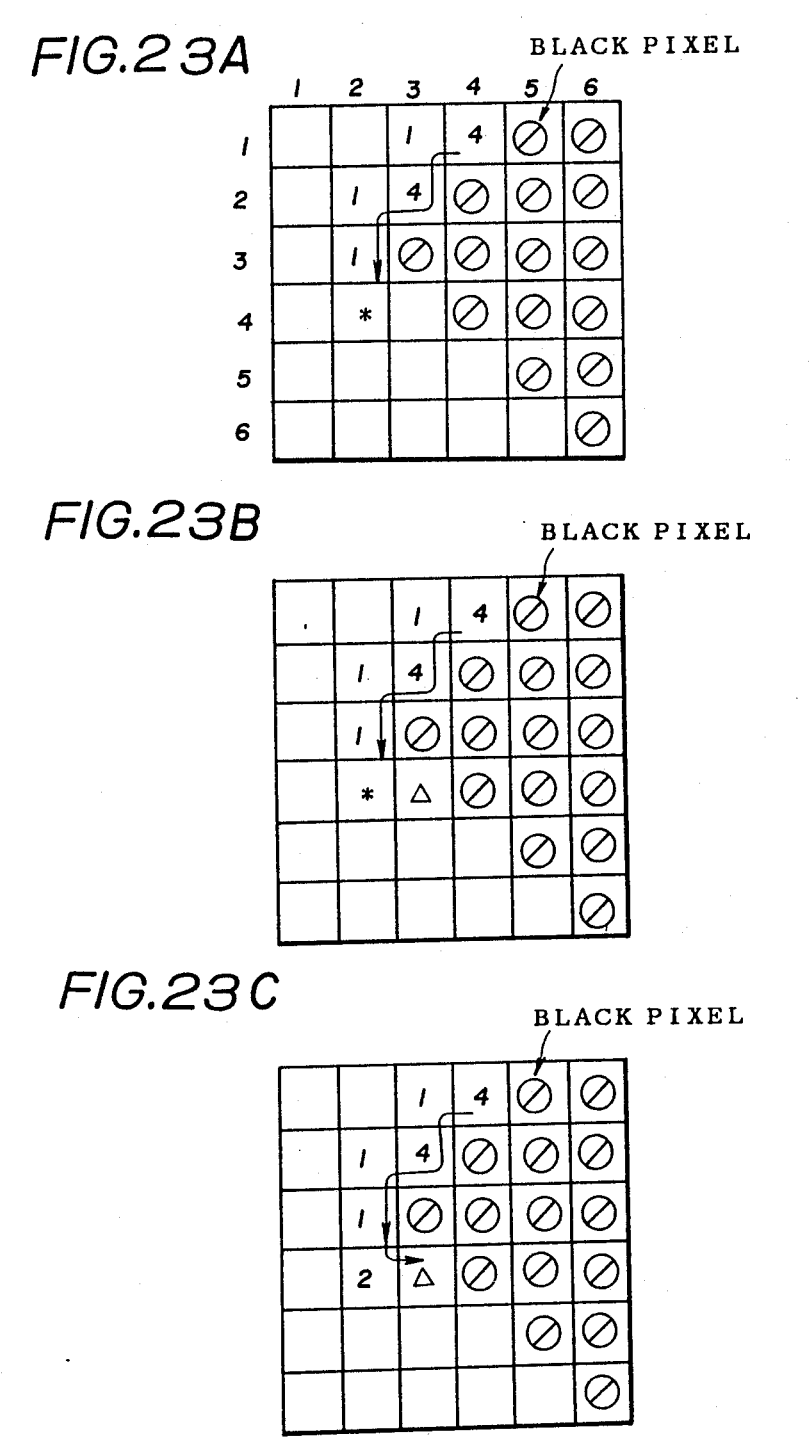

The process of the example 1A is described in more detail with reference to a concrete example shown in FIGS. 23A through 23C. FIG. 23A shows a state where the contour tracing proceeds as shown by an arrow, and directional codes have been assigned as 4→1→4→1→1. At this time (i.e. the process is located at step 128), a position of a symbol * is the point of interest, and P=(2, 4) and ΔP=(0, 1) (lower direction). Then, the unit vector ΔP is rotated in the counterclockwise direction by an angle of 90° (step 123), and the pixel at a position of a symbol Δ shown in FIG. 23B is referred to (step 124) and checked whether or to it is a white pixel (step 125). In the illustrated example, the pixel at the position Δ is a white pixel. Therefore, as shown in FIG. 23C, the directional code '2' corresponding to the unit vector ΔP=(1, 0) (right-hand direction) is assigned to the pixel at the position * and registered (step 127). Then, the address counter NC is incremented by 1 and the vector P+ΔP (at this time, ΔP=(1, 0)) is set to P (step 128). Thereby, the next pixel of interest is shifted to the position Δ.

EXAMPLE 2A

In example 2A, a contour tracing process shown in FIG. 5 is used, in which the contour is traced in the clockwise direction along white pixels. Directional codes are sequentially assigned to traced white pixels.

Figure 24:
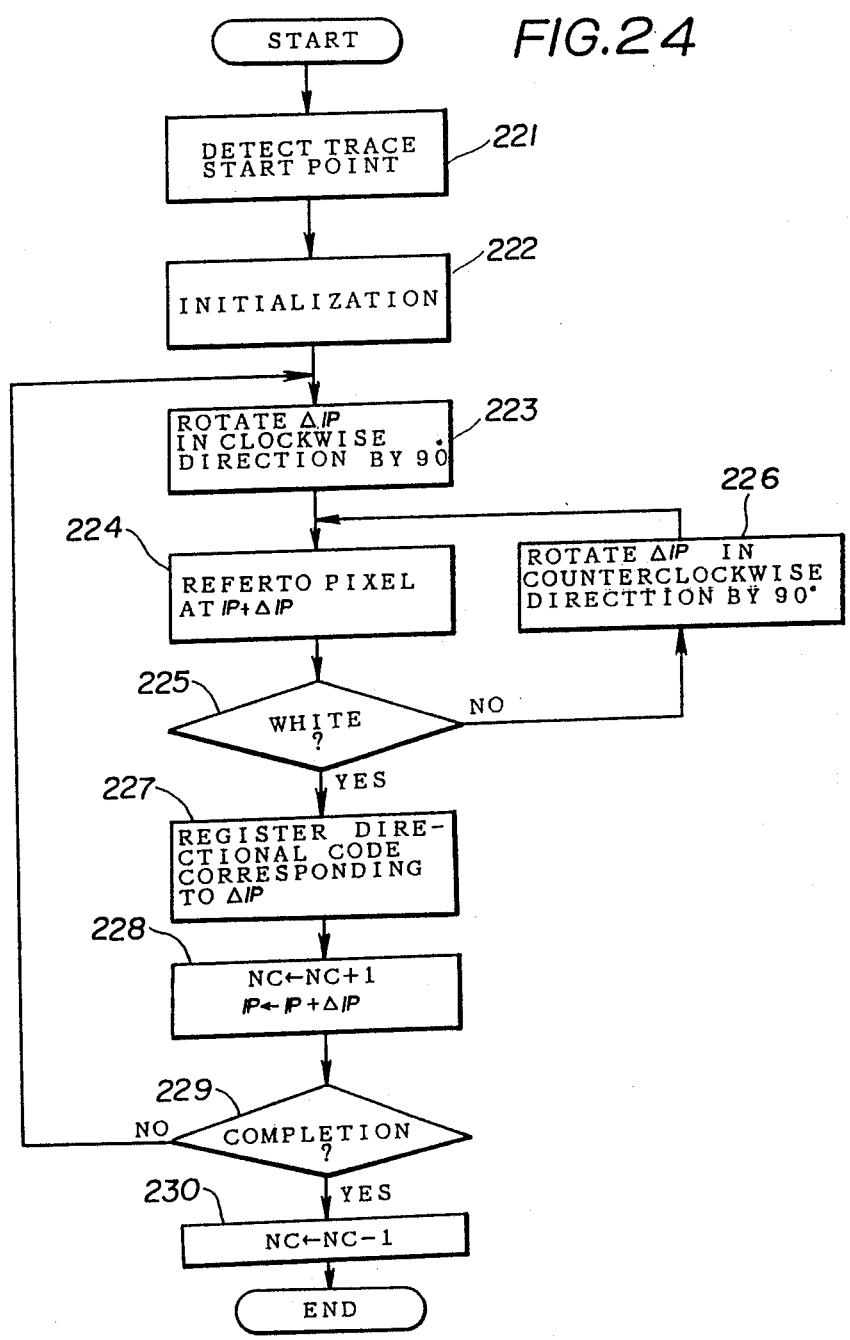
FIG. 24 is a flow chart of a second example of the feature extracting process provided by the present invention.

FIG. 24 is a flow chart of the feature extracting process of the example 2A. In FIG. 24, steps 221 to 226 coincide with steps 201 to 206 shown in FIG. 5, respectively. FIG. 24 differs from FIG. 5 in steps 227 to 230. These steps 227 to 230 correspond to steps 127 to 130 shown in FIG. 22.

Figure 25A:
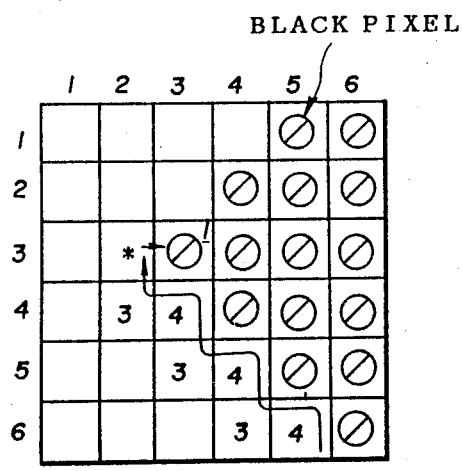
FIGS. 25A through 25D are views showing a concrete example of the feature extracting process of the second example.
Figure 25B:
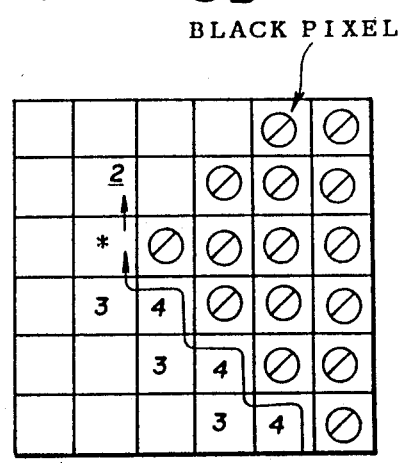
Figure 25C:
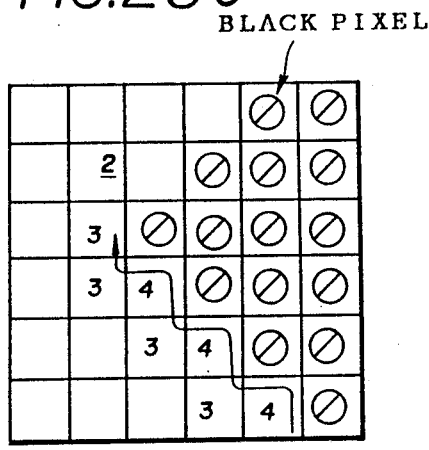
Figure 25D:
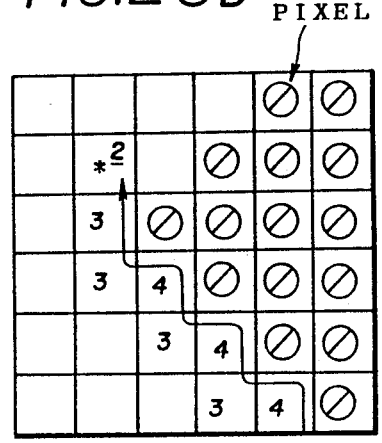

The feature extracting process is further described in detail with reference to a concrete example shown in FIGS. 25A through 25D. FIG. 25A shows a state in which directional codes have been assigned as 4→3→4→3→4→3. At this time (i.e., the process is located at step 228), a position of a symbol * is the point of interest, and P=(2, 3) and ΔP=(0, −1) (upper direction). Then, the unit vector ΔP is rotated in the clockwise direction by an angle of 90° (step 223), and a pixel at a position 1 shown in FIG. 23B is referred to (step 224) and checked whether or to it is a white pixel (step 225). In the illustrated example, the pixel at the position 1 is a black pixel. Therefore, as shown in FIG. 25B, the unit vector ΔP is rotated in the counterclockwise direction by an angle of 90° at step 226, so that ΔP=(0, −1) (upper direction). Then, a pixel at a position 2 shown in FIG. 25B is referred to (step 224) and checked whether or not it is a white pixel (step 225). At this time, the checked pixel is a white pixel. Therefore, as shown in FIG. 25C, the directional code 3 corresponding to the unit vector ΔP=(0, −1) is assigned to the pixel at the point of interest and registered (step 227). Then, the count value of the address counter NC is incremented by 1 and the vector P+ΔP (at this time, ΔP=(0, −1)) is set to P (step 228). Thereby, the next point of interest is shifted to the position 2.

EXAMPLE 3A

In example 3A, the contour tracing process shown in FIG. 7 or 22 is used, in which the contour of the binary image is traced along white pixels in the counterclockwise direction while coping with noise. Directional codes are sequentially assigned to traced white pixels.

Figure 26:
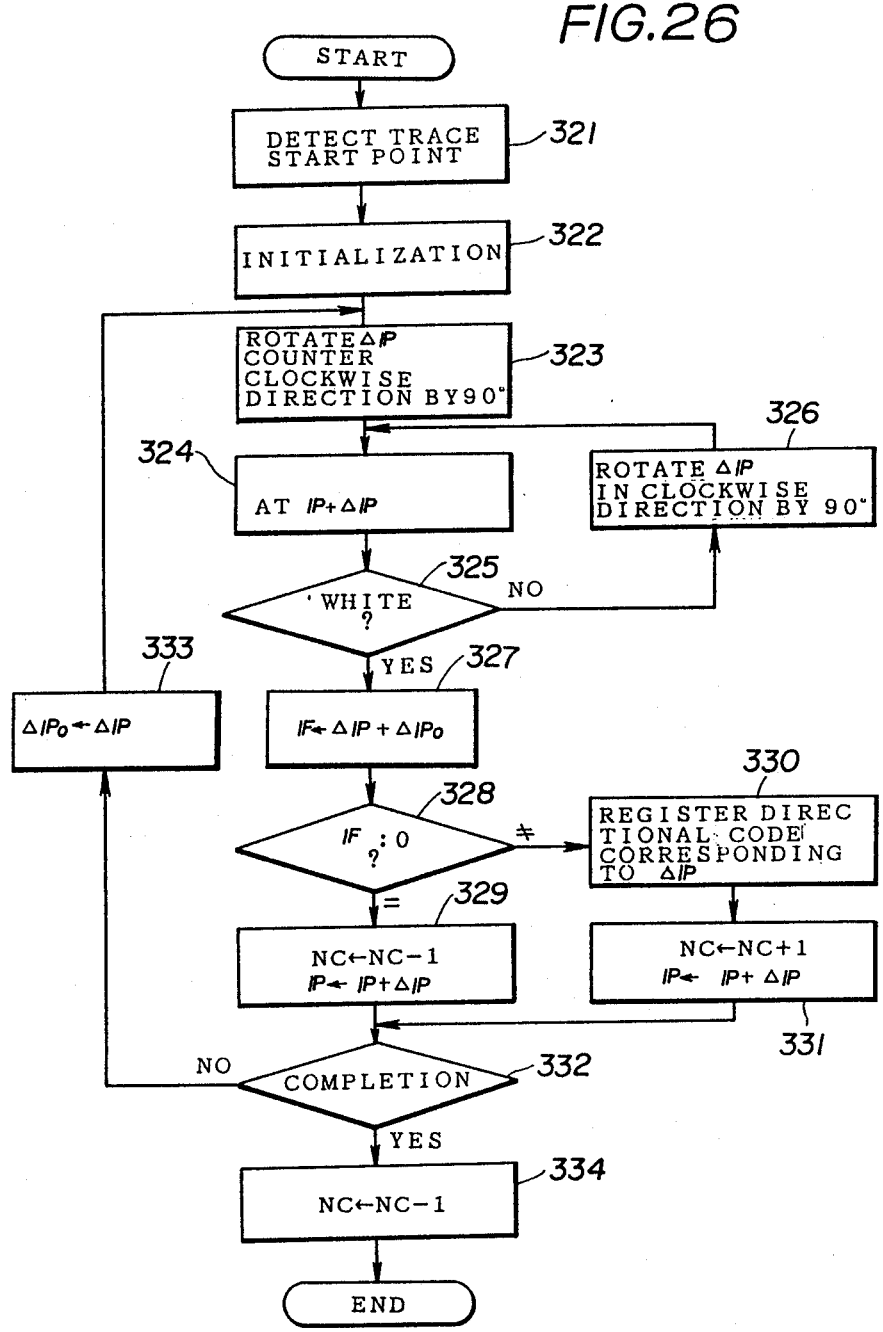
FIG. 26 is a flow chart of a third example of the feature extracting process provided by the present invention.

FIG. 26 is a flow chart of a feature extracting process of the example 3A. In FIG. 26, steps for tracing the contour and assigning the directional code to the trace point are the same as those in the example 1A shown in FIG. 22. The process shown in FIG. 26 differs from that shown in FIG. 22 in the following. First, the unit vector $\Delta P$ at step 329 which indicates a direction of motion to the next trace point is set to $\Delta Po$ (step 313). Then, subsequent to step 325, step 326 is carried out in which the vector $P+\Delta P$ is set to a vector F, and the vector F is checked whether or not it is 0 (step 328). When $F=0$, the pixel at the point of interest is considered as a noise and directional codes which have been assigned due to the presence of the noise are cancelled (step 329). For this purpose, the address counter NC is decremented by 1 (step 329). Steps 330, 331 and 334 correspond to steps 127, 128 and 130 shown in FIG. 22, respectively.

The feature extracting process of the example 3A is further described with reference to a concrete example shown in FIGS. 27A through 27C. FIG. 27A shows a state in which there is no noise, FIG. 27B shows a state before cancelling directional codes due to a noise in accordance with the noise process described above, and FIG. 27C shows a state after cancelling the directional codes due to the noise in accordance with the noise process. Numerals shown in these figures denote directional codes. In FIG. 27B, when the tracing process reaches a pixel at the point of interest, the vector $\Delta Po=(1, 0)$ (which means that the direction of motion is rightwards and the directional code is '2'). When the tracing process leaves the point of interest, the vector $\Delta Po=(-1, 0)$ (which means that the direction of motion is leftwards and the directional code is '4'. At this time, F $(=\Delta P+\Delta Po)=0$ and therefore the noise process starts. In the noise process, the directional code relating to the noise is not registered. In the illustrated example, the directional code '4' assigned to the noise is not registered. Then, the address counter NC is decremented by 1 (step 329). Thereby, a directional code '2' just prior to the directional code '4' is cancelled and a directional code of '1' which is assigned by the next tracing routine starting from step 323 is registered. As a result, as shown in FIG. 27B, a directional code sequence obtained when the noise process is not performed (FIG. 27B) is [ . . . 1 1 2 4 1 1 1 1 . . . ], whereas a directional code sequence obtained when the noise process is carried out is [ . . . 1 1 1 1 1 1 . . . ] as shown in FIG. 27C. It should be noted that the latter code sequence coincides with the code sequence shown in FIG. 27A where the contour has no noise.

EXAMPLE 4A

In example 4A, the contour tracing process shown in FIG. 9 or FIG. 24 is used, in which the contour of the binary image is traced in the clockwise direction along white pixels while carrying out the noise process. Directional codes are sequentially assigned to traced white pixels.

Figure 28:
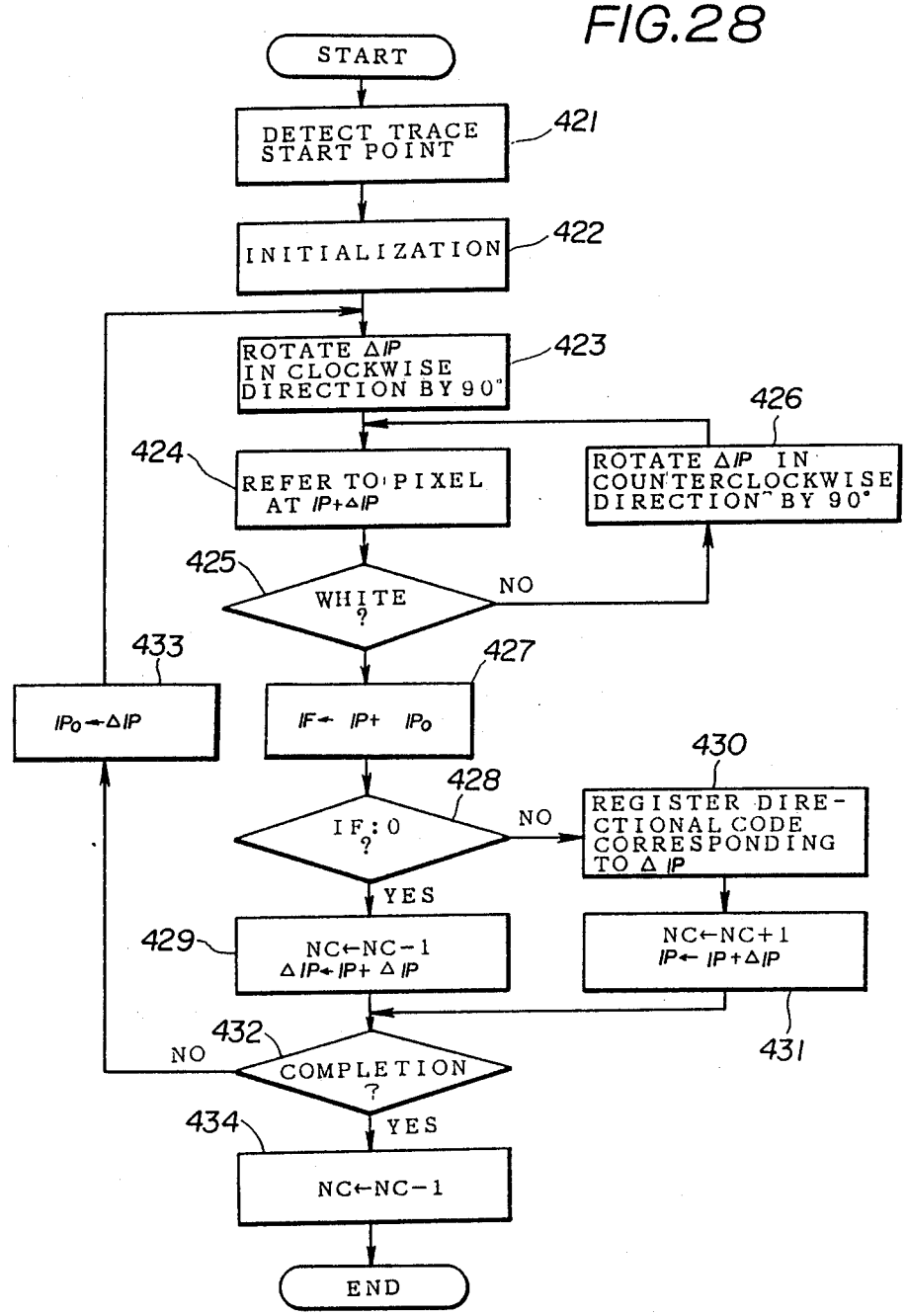
FIG. 28 is a flow chart of a fourth example of the feature extracting process provided by the present invention.

FIG. 28 is a flow chart of a feature extracting process of the example 4A. In this figure, a basic process for tracing the contour of the binary image and assigning directional codes to traced white pixels is the same as that shown in FIG. 24, and the noise process is the same as that shown in FIG. 26. That is, steps 421 to 426 are the same as steps 221 to 226 shown in FIG. 24, respectively. And, steps 427 to 434 are the same as steps 327 to 334 shown in FIG. 26, respectively. Therefore, an explanation on the example 4A is omitted. FIGS. 29A through 29C show a concrete example of the noise process of the example 4A.

EXAMPLE 5A

In example 5A, the contour tracing process shown in FIG. 11 is used, in which the contour of the binary image is traced in the counterclockwise direction along black pixels. Directional codes are sequentially assigned to traced black pixels.

Figure 30:
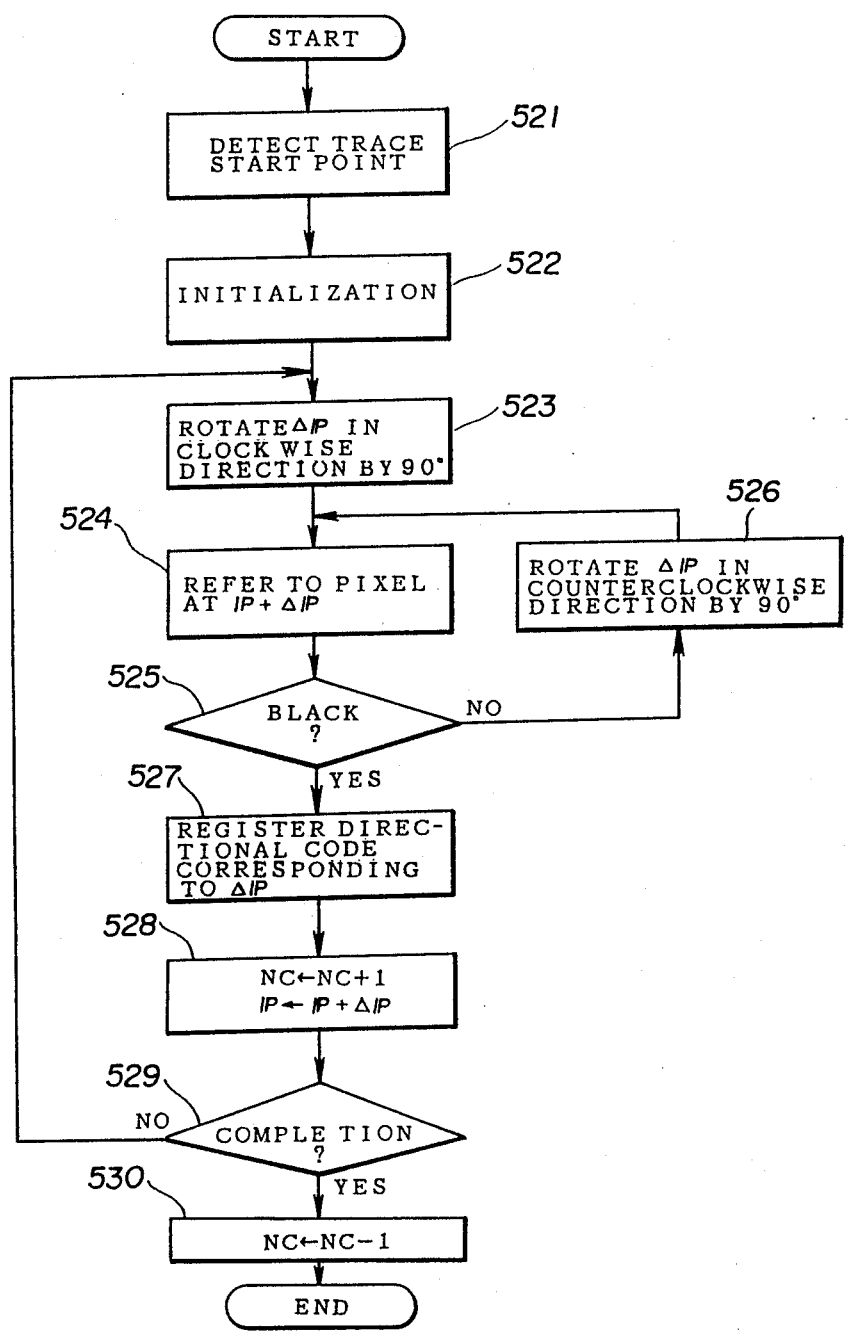
FIG. 30 is a flow chart of a fifth example of the feature extracting process provided by the present invention.

FIG. 30 is a flow chart of a feature extracting process of the example 5A. In this figure, steps 521 to 526 are the same as steps 501 to 506 shown in FIG. 11, respectively. Futher, steps 527 to 530 are the same as steps 127 to 130 shown in FIG. 22, respectively.

Figure 31A:
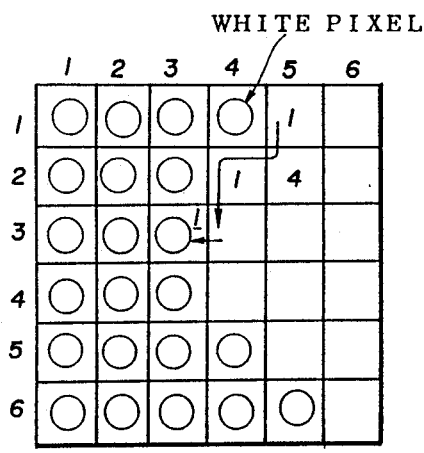
FIGS. 31A through 31D are views showing a concrete example of the feature extracting process provided by the present invention.
Figure 31B:
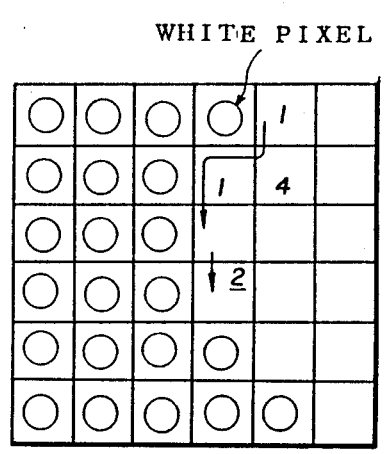
Figure 31C:
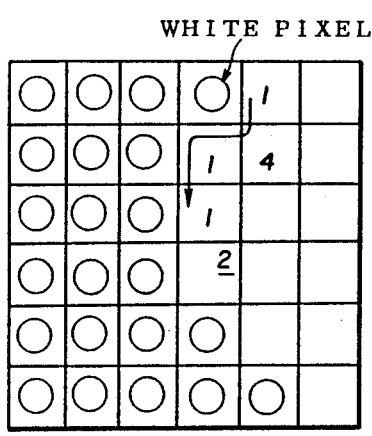
Figure 31D:
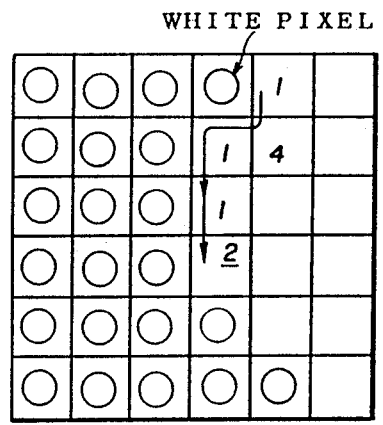

A further explanation of the example 5A is described with reference to a concrete example shown in FIGS. 31A through 31D. FIG. 31A shows a state where the trace proceeds as shown by an arrow, and directional codes have been assigned such as 1→4→1. At this time, the position of a symbol * is the point of interest. That is, the vector $P+\Delta P$ at step 528 is as follows: $P=(4, 3)$ (position *), $\Delta P=(0, 1)$ (lower direction). Then, the unit vector $\Delta P$ is rotated in the clockwise direction by an angle of 90° (step 523), so that $\Delta P=(-1, 0)$ (left-hand direction). Then, the pixel of $P+-P$ having the above values (i.e., located at a position 1 shown in FIG. 31A) is referred to (step 524) and checked whether it is a black pixel (525). In this example, the pixel at the position 1 is a white pixel. Therefore, the unit vector $\Delta P$ is rotated in the counterclockwise direction by an angle of 90° (step 526), and the pixel designated by this rotation, i.e., the pixel at a position 2 shown in FIG. 31B is referred to (step 524) and is checked whether or not it is a black pixel (step 525). This pixel is a black pixel. Thus, as shown in FIG. 31C, the directional code '1' is assigned to the pixel at the point of interest (step 527). Thereafter, the count value of the address counter NC is incremented by 1 and the vector $P+\Delta P$ at step 524 ($\Delta P=(0, 1)$ at this time) is to P (step 528). Thereby, the point of interest is shifted to the position 2.

EXAMPLE 6A

In example 6A, the contour tracing process shown in FIG. 14 is traced, in which the contour is traced in the clockwise direction along black pixels. Directional codes are sequentially assigned to traced black pixels.

Figure 32:
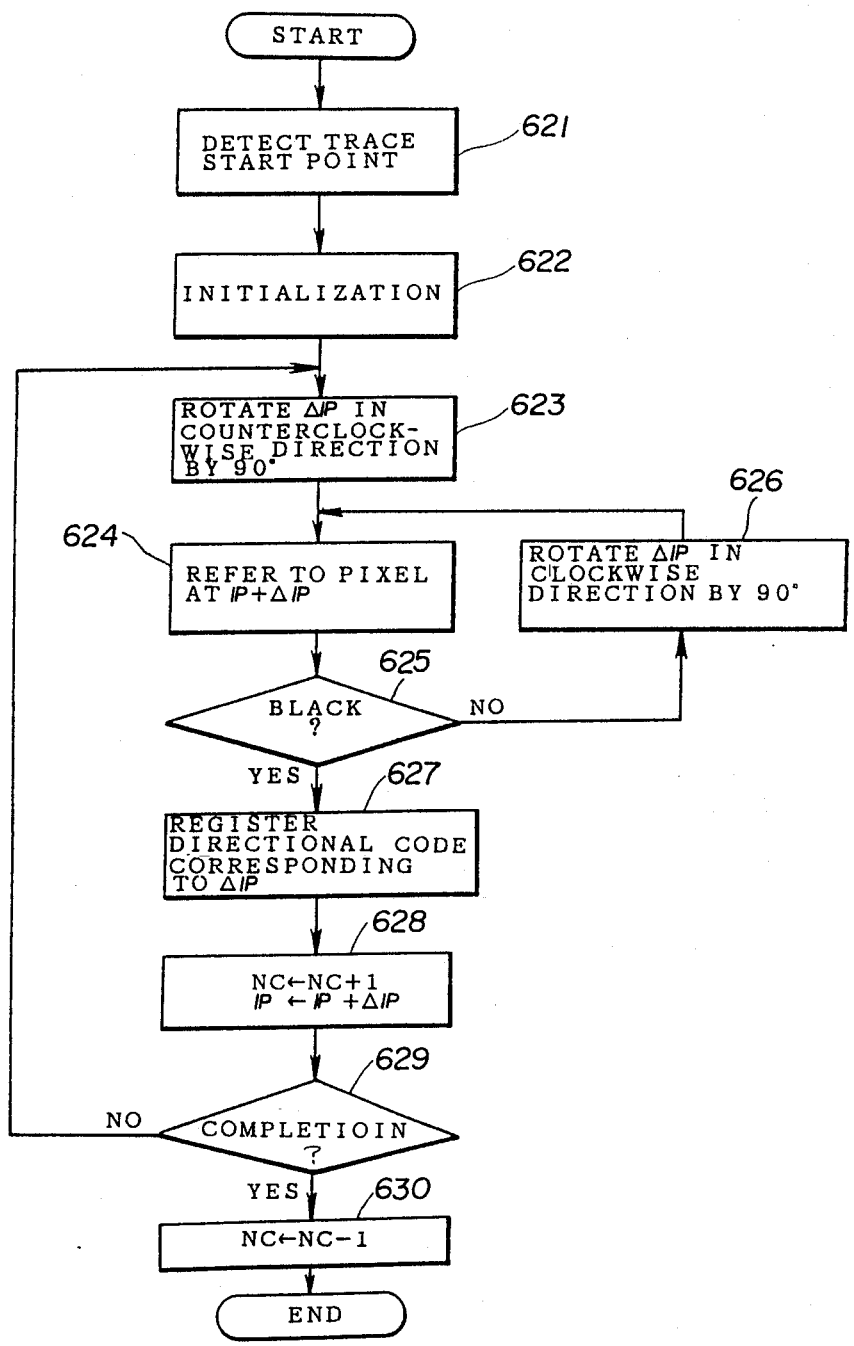
FIG. 32 is a flow chart of a sixth example of the feature extracting process provided by the present invention.

FIG. 32 is a flow chart of a feature extracting process of the example 6A. In this figure, steps 621 to 626 are the same as steps 601 to 606 shown in FIG. 14, respectively. Further, steps 627 to 630 are the same as steps 127 to 130 shown in FIG. 22, respectively.

Figure 33A:
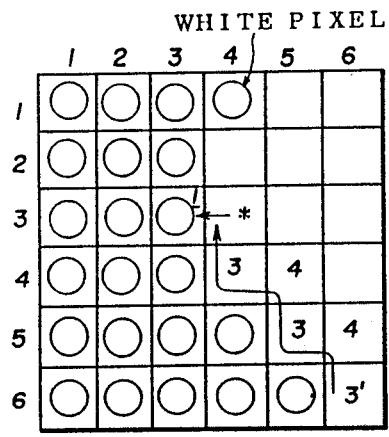
FIGS. 33A through 33D are views showing a concrete example of the feature extracting process of the sixth example.
Figure 33B:
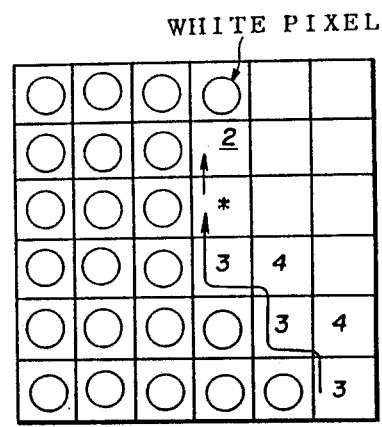
Figure 33C:
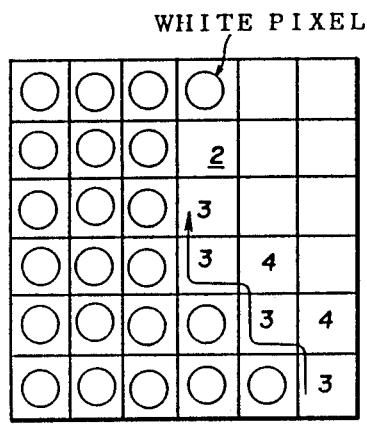
Figure 33D:
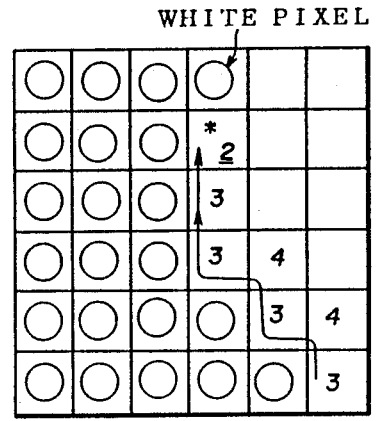

A further explanation on the example 6A is described with reference to a concrete example shown in FIGS. 33A through 33D. FIG. 33A shows a state in which the trace proceeds as shown by an arrow and directional codes have been assigned as 3→4→3→4→3 to the corresponding black pixels. At this time, the point of interest is at a position of a symbol *, and the vector $P+\Delta P$ at step 628 is as follows: $P=(4, 3)$ (at the position *), $\Delta P=(0, 1)$ (upper direction). Then, the unit vector $\Delta P$ is rotated in the counterclockwise direction by an angle of 90° (step 623), so that ΔP=(−1, 0) (left-hand direction). Thereafter, a pixel designated by the vector P+ΔP having the above values i.e., a pixel at a position 1 is referred to (step 624) and checked whether or not it is a black pixel (step 625). In this illustrated example, the pixel at the position 1 is a white pixel. Therefore, the unit vector ΔP is rotated in the clockwise direction by an angle of 90°, so that a pixel at a position 2 shown in FIG. 33B is referred and checked (steps 626, 624 and 625). Since the pixel at the position 2 is a black pixel, the directional code '3' is assigned to the pixel at the point of interest and registered (627). Then, the count value of the address counter NC is incremented by 1 and the vector P+ΔP is set to P (step 628). As a result, the point of interest is shifted to the position 2.

EXAMPLE 7A

In example 7A, the contour tracing process shown in FIG. 16 or 30 is used, in which the contour of the binary image is traced in the counterclockwise direction along black pixels while coping with noise. Directional codes are sequentially assigned to traced black pixels.

Figure 34:
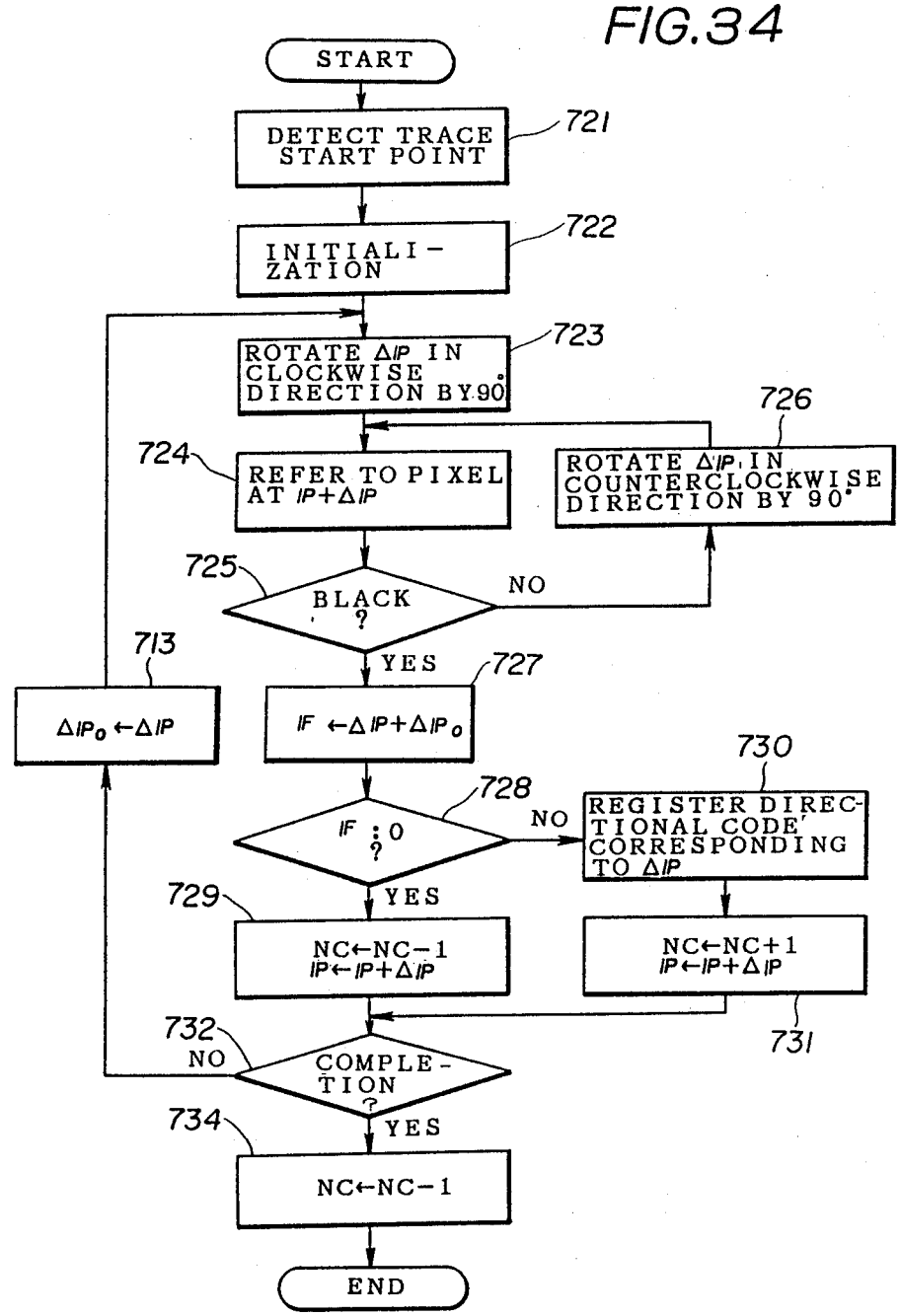
FIG. 34 is a flow chart of a seventh example of the feature extracting process provided by the present invention.

FIG. 34 is a flow chart of a feature extracting process of the example 7A. In FIG. 34, teps 721 to 726 are the same as steps 521 to 526 shown in FIG. 30, respectively. Further, steps 727 to 733 are the same as 527 to 533 shown in FIG. 26, respectively.

A further explanation on the example 7A is described with reference to a concrete example shown in FIGS. 35A through 35C. FIG. 35A shows a state in which there is no noise, FIG. 35B shows a state before cancelling directional codes due to a noise in accordance with the noise process described above, and FIG. 35C shows a state after cancelling directional codes due to the noise in accordance with the noise process. Numerals shown in these figures denote directional codes. In FIG. 35B, when the tracing process reaches a pixel at the point of interest, the vector ΔPo=(−1, 0) (which means that the direction of motion is leftwards and the directional code is '4'). When the tracing process leaves the point of interest, the vector ΔPo=(1, 0) (which means that the direction of motion is rightwards and the directional code is '2'. At this time, F (=ΔP+ΔPo)=0 and therefore the noise process starts. In the noise process, the directional code relating to the noise is not registered. In the illustrated example, the directional code '2' assigned to the noise is not registered. Then, the address counter NC is decremented by 1 (step 729). Thereby, a directional code '4' just prior to the directional code '2' is cancelled and a directional code of '1' which is designated by the next tracing routine starting from step 723 is registered. As a result, as shown in FIG. 35C, a directional code sequence obtained when the noise process is not performed (FIG. 35B) is [... 1 4 2 1 1 1 1 ...], whereas a directional code sequence obtained when the noise process is carried out is [... 1 1 1 1 1 1 ...] as shown in FIG. 35C. It should be noted that the latter code sequence coincides with the code sequence shown in FIG. 35A where there is no noise.

EXAMPLE 8A

In example 8A, the contour tracing process shown in FIG. 18 or FIG. 32 is used, in which the contour of the binary image is traced in the clockwise direction along black pixels while coping with noise. Directional codes are sequentially assigned to traced black pixels.

Figure 36:
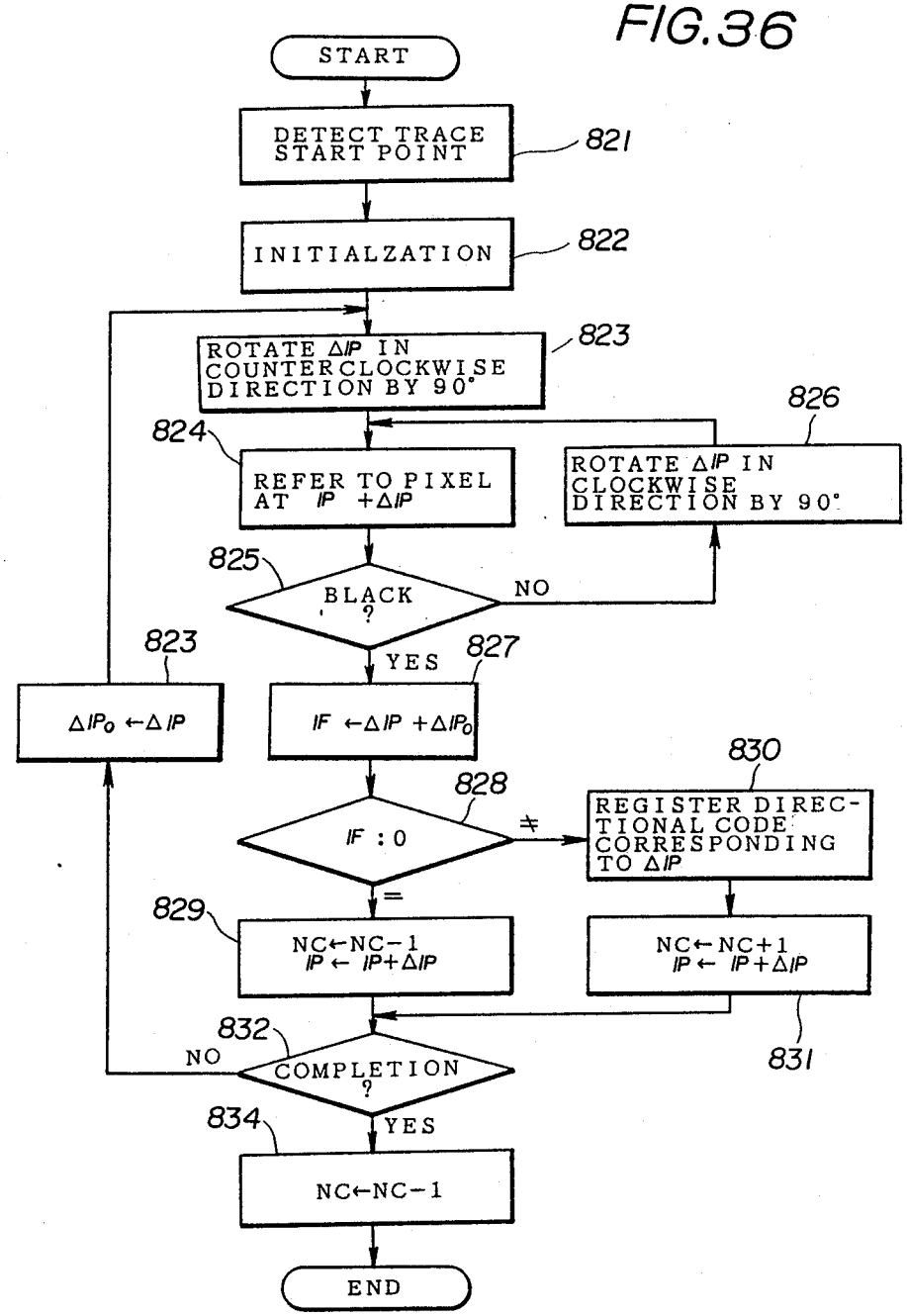
FIG. 36 is a flow chart of an eighth example of the feature extracting process provided by the present invention.

FIG. 36 is a flow chart of a feature extracting process of the example 8A. In this figure, a basic process for tracing the contour of the binary image and assigning directional codes to traced black pixels is the same as that shown in FIG. 32, and the noise process is the same as that shown in FIG. 34. That is, steps 821 to 826 are the same as steps 621 to 626 shown in FIG. 32, respectively, and steps 827 to 834 are the same as steps 727 to 734 shown in FIG. 34, respectively. Therefore, an explanation on the example 8A is omitted. FIGS. 35A through 35C show a concrete example of the noise process of the example 4A.

According to the feature extracting method described above, it is possible to carry out the process at a speed higher than that for the conventional process. The reasons are as follows. First, it is not necessary to always refer to all of the adjacent pixels in order to assign the directional codes to the pixels along the contour. For example, it is possible to assign the directional code to the related pixel by referring to only one adjacent pixel with respect to the pixel of interest. Secondly, it is not necessary to refer to tables in which the directional code to be assigned is defined depending on the combinations of white (or black) pixels adjacent to the center pixel at the point of interest. Moreover, the directional code is assigned by rotating the unit vector in an optimum direction. Furthermore, it is possible to obtain a precise and stable features of the contour, because a bad influence due to noise can be eliminated by the feature extracting process.

A description will be given on an example of a hardware for implementing the above feature extracting process of the present invention, referring to FIG. 38. In this figure, the same reference numerals as those in FIG. 20 denote the same elements.

The image scanner 10 optically reads characters on a paper or the like and defines a binary image of each character (for example a value "0" for a white pixel and a value "1" for a black pixel). The binary image thus obtained is stored in the original image memory 40. The CPU 20 raster-scans the binary image (original image) stored in the original image memory 40 and detects the start point from which the tracing process starts. Then, the CPU 20 traces the contour of the raster-scanned binary image in the clockwise or counterclockwise direction and designates the related directional codes in accordance with a feature extracting program 32 stored in the program memory 30. The feature extracting program memory 30. The feature extracting program 32 implements one sequence selected from among the contour tracing processes shown in FIGS. 22, 24, 26, 28, 30, 32, 34 and 36. The directional codes thus obtained are stored in a directional code image memory 70 which has addresses corresponding to addresses associated with the original image memory 40. That is, the content of the directional code image memory 70 indicates a two-dimensional contour image. Simultaneously, the directional codes are successively written in a directional code sequence storing region 64 formed in the RAM 60 in the one-dimensional form. That is, the content of the directional code sequence storing region 64 is a one-dimensional directional code sequence. A write address for the directional code sequence storing region 64 is designated by the address counter NC described previously, which is provided in the RAM 60. As described, the address counter NC 65 is incremented by 1 every time the directional code is written in the region 64.

The feature extracting processes described above are applicable to character recognition methods. For example, the feature extracting processes of the present invention are applicable to the character recognition method which is disclosed in the U.S. patent application Ser. No. 51,611, which was assigned to the assignee of this application and is incorporated herein by reference. As described previously, according to this publication, the feature-assigned contour image composed of feature-assigned trace pixels is divided into a plurality of sub-regions, and the histogram for each divided sub-region is calculated. Therefore, it is possible to utilize the feature-assigned contour image stored in the directional code image memory 70 in the above process.

However, it is preferable to combine the contour tracing process of the present application with a following process for identifying characters according to the present invention described below.

A description will be given on an identification process of the present invention.

As described before, the content of the directional code sequence storing region 64 is the one-dimensional directional code sequence which aligns the sequence of appearance of the directional code obtained upon the contour tracing process. According to the present invention, a region for storing the one-dimensional directional code sequence is divided into a plurality of one dimensional sub-regions. Next, a number of the directional codes included in each sub-region is counted. Then, a distribution of the directional codes is calculated for each sub-region and compared with a predetermined distribution for identification of the unknown character. Since the sub-regions are one-dimensional regions, a process for calculating the distribution of the directional codes is simpler than the conventional process in which the region is divided into two-dimensional sub-regions. In addition, each of the sub-regions has the directional codes, that is, no wasteful part exists therein.

First of all, a description will be given on a hardware structure for implementing the identification process of the present invention in order to facilitate a better understanding thereof.

FIG. 39 is a block diagram of a hardware structure for implementing the recognition process of the present invention. In FIG. 39, the same reference numerals as those in FIGS. 20 and 38 denote the same elements. The image scanner 10 optically reads characters on a paper or the like and defines a binary image of the character (for example a value "0" for a white pixel and a value "1" for a black pixel). The binary image thus obtained is stored in the original image memory 40. The CPU 20 raster-scans the binary image (original image) stored in the original image memory 40 and detects the start point from which the tracing process starts. This start point is stored in the start point storing region 62 formed in the RAM 60. Then, the CPU 20 sequentially traces the contour of the raster-scanned binary image in the clockwise or counterclockwise direction and sequentially determines the directional codes in accordance with a feature quantity calculating program 33 in the program memory 30. This program 33 includes the feature extracting program 32 shown in FIG. 20. The feature extracting program 32 included in the program 33 is one program selected from among the countour tracing processes shown in FIGS. 22, 24, 26, 28, 30, 32, 34 and 36. The CPU 20 manages the address counter (pointer) NC 65 in the RAM 60, and increments the counter NC 65 by 1 every time the directional code is stored in the directional code sequence storing region 64. As a result, the directional code sequence is stored in the directional code sequence storing region 64 in the sequence of appearance of the directional code. When the counter tracing process returns to the start point, i.e., the process is completed, the CPU carries out the division of the directional code sequence storing region 62. Next, the CPU 20 calculates the number of the directional codes for each divided sub-region, and then the distribution of the directional codes (histogram) for each sub-region, and then stores the calculated histogram into a histogram storing region 66 formed in the RAM 60. The histogram calculated for each sub-region indicates feature quantity of the unknown character which is cut out of the character sequence. The above process subsequent to the feature extraction is also carried out in accordance with the feature quantity calculating program 33 stored in the RAM.

On the other hand, predetermined feature quantity for each character is registered beforehand in a dictionary memory 80. The CPU 20 calculates a distance (difference) between the feature quantity stored in the histogram storing region 66 and the feature quantity selectively read out from the dictionary memory 80, and identifies the unknown character.

The process for calculating the distance is carried out in accordance with an identification program 34 stored in the RAM 30. The hardware structure shown in FIG. 39 does not have the directional code image memory 70 shown in FIG. 38. This is because this memory 70 is used when the two-dimensional region is divided into the two-dimensional sub-regions.

Figure 40:
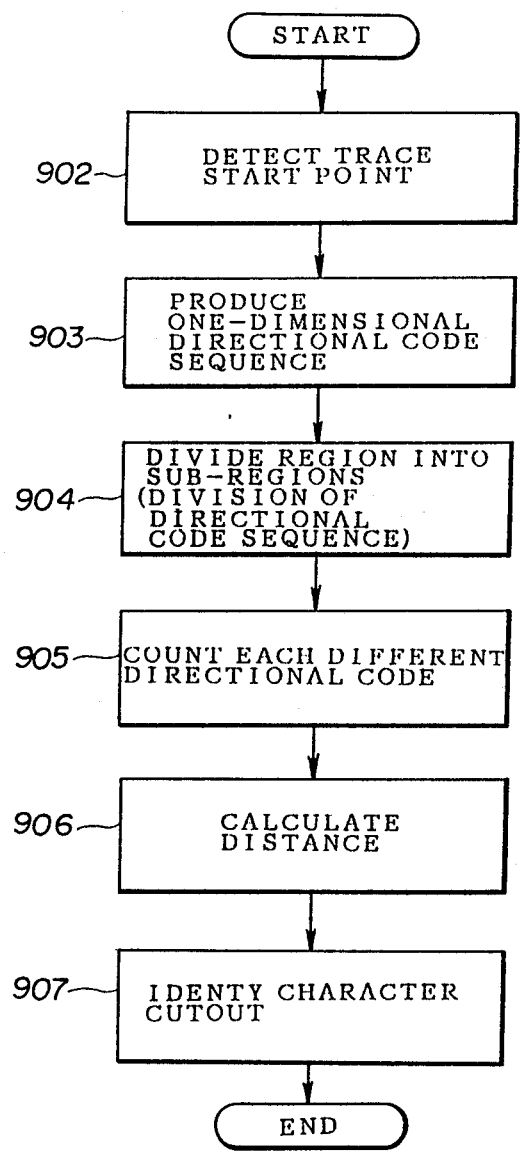
FIG. 40 is a flow chart of the character recognition process implemented by the hardware shown in FIG. 39.

FIG. 40 is a flow chart of a process for one character which is implemented by the CPU 20. The illustrated process sequence is repeated for each character stored in the original image memory 40. A description will be given of each step shown in FIG. 40.

STEPS 902 and 903

A sequence of steps 902 and 903 corresponds to the feature extracting program 32 shown in FIG. 38. Step 902 determines the start point from which the contour of the binary image stored in the original image memory 40 is traced. Step 903 traces the contour of the binary image stored in the original image memory 40 in the counterclockwise or clockwise direction along white or black pixels, and sequentially assigns the directional code to each trace pixel, and sequentially stores the directional code in the directional code sequence storing region 64 shown in FIG. 39. The tracing process is terminated when returning to the start point. The feature extracting program 32 is one program selected from among the contour tracing processes shown in FIGS. 22, 24, 26, 28, 30, 32, 34 and 36.

STEP 904

Step 904 carries out the division of the one-dimensional directional code sequence stored in the region 64. The most simple division method is to equally divide the region, i.e., the one-dimensional code sequence into a plurality of partial code sequences each of which corresponds to one sub-region. Hereafter, this method is referred to as a first dividing method. Also, it is possible to equally divide the one-dimensional code sequence into partial code sequences and to form sub-regions so as to combine at least m (m is an integer equal to 3 or over) consecutive partial code sequences in such a way that partial directional codes at beginning and end thereof are commonly owned by the mutually adjacent sub-regions. Hereafter, this method is referred to as a second dividing method.

Figure 41:
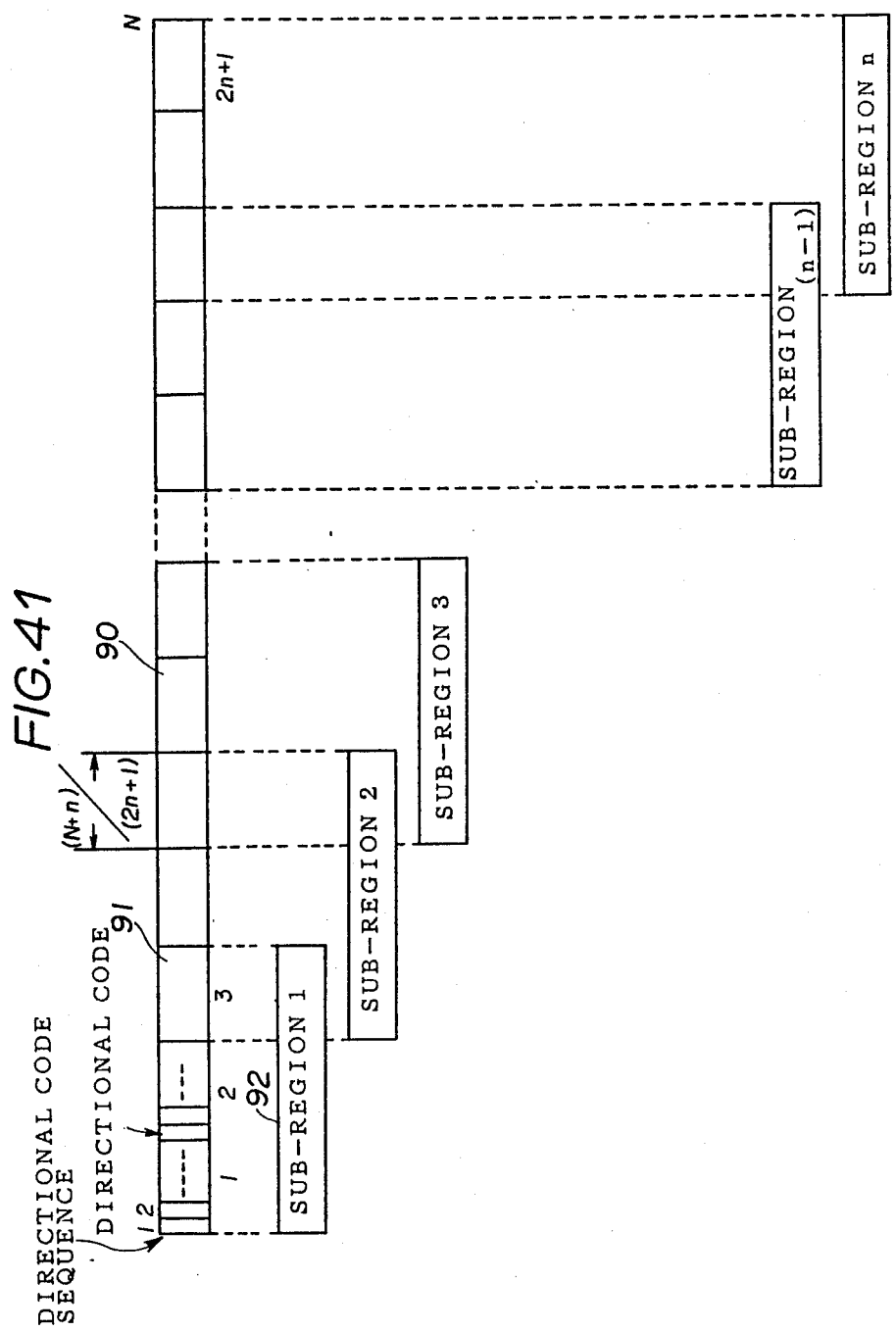
FIG. 41 is a view for explaining a division of a region in which a one-dimensional directional code sequence is stored.

FIG. 41 is a view for explaining the region dividing method. The illustrated example is a case where m=3. One region 90 consists of N (N is an integer) directional codes. First, the region 90 is equally divided into (2n+1) regions i.e., partial directional code sequences. Each of the partial code sequences has (N+n)/(2n+1) directional codes where (N+n)/(2n+1) means that fractions over ½ are rounded up to one and the rest is rounded down to 0 for N/(2n+1). Three consecutive partial directional code sequences are made into one sub-region 92 in such a way that partial directional codes at both ends (beginning and end) thereof are commonly owned by the mutually adjacent sub-regions. For example, the first partial directional code sequence of a sub-region 2 corresponds to the least partial directional code sequence of a sub-region 1, and the last partial code sequence of the sub-region 2 corresponds to the head partial code sequence of a sub-region 3. In this manner, n sub-regions are formed.

STEP 905

A step 905 counts a number of each of four different directional codes of '1', '2', '3' and '4' for each sub-region and produces a distribution (histogram) defining a total number of each of the mutually different directional codes for each sub-region. Each sub-region may be formed in accordance with the above-described first or second dividing method. Actually, it is preferable to employ the second dividing method. This is because the second dividing method can provide a flexible histogram against noise and a displacement between the actual and detected start points.

A further explanation on step 905 is given below, by referring to FIGS. 42A through 44.

Figure 44:
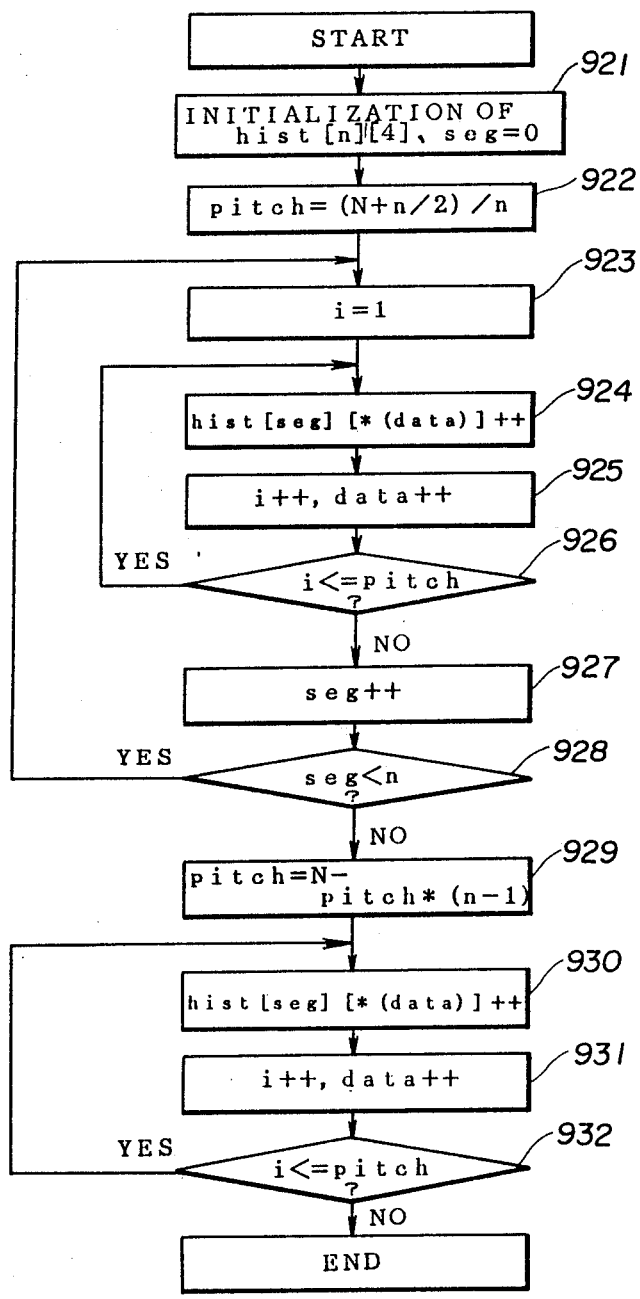
FIG. 44 is a flow chart for producing histograms.

FIG. 42A shows a binary image in which the directional code is assigned to each white pixel arranged along the contour of the binary image. Numerals aligned in x and y directions denote coordinates (addresses or positions). FIG. 42B shows a one-dimensional directional code sequence correspoding to FIG. 42A. In other words, this one-dimensional directional code sequence corresponds to the sequence stored in the one-dimensional directional code sequence storing region 64 shown in FIG. 39. FIG. 43 shows a histogram for each sub-region of the one-dimensional directional code sequence shown in FIG. 42. FIG. 44 is a flow chart of a detailed sequence of step 905 shown in FIG. 40. The sequence shown in FIG. 44 depends on the first dividing method described above.

Now, various symbols shown in FIG. 44 are defined below. A symbol 'n' is a number of equally divided sub-regions. A symbol 'hist[n] [4]' denotes a region for storing the histogram for each sub-region. A symbol 'seg' denotes a variable for indicating a currently processed sub-region. A symbol 'data' denotes an address variable (pointer or counter) in which when the process of the histogram calculation is activated, it indicates the beginning of the region 64 in which the one-dimensional directional code sequence is stored. A symbol '(*data)' denotes a content of the 'data'. A symbol 'N' denotes a number of the directional codes stored in the region 64. A symbol 'pitch' denotes a number of the directional codes in one sub-region (i.e., a width of one sub-region). A symbol 'i' denotes a temporary counter which is incremented by 1 every time one directional code is processed. A symbol '++' denotes an operating symbol in which x++ designates setting x+1 to x.

First of all, an initialization of hist[n] [4] and the setting of seg=0 are carried out (step 921 ). Next, the number of the directional codes for one sub-region is calculated in accordance with pitch=(N+n/2)/n (step 922 ). In the example shown in FIGS. 42A and 42B, N=106 and the region is equally divided into 8 sub-regions. Therefore, the number of the directional codes in one sub-region is equal to 13 (pitch=13). Then, a value 1 is set in the temporary pointer 'i' (step 923 ). In the beginning, the counter 'i' indicates the head (first) address of the one-dimensional directional code sequence. In the illustrated example, the pointer 'i' indicates the beginning of the sequence shown in FIG. 42B and the content of this address *(data) is 4 where data=1. Then, a histogram for one sub-region is calculated in accordance with a sequence of steps 924 to 926 . In the beginning, seg=1 and *(data)=4. Therefore, hist[1] [4] is incremented by 1 (step 924 ). This means that the region acting as a counter relating to the directional code 4 positioned at the first address of the sub-region 1 is incremented by 1. Subsequent to step 924 , the temporary counter 'i' is incremented by 1 and the pointer 'data' is incremented by 1 (step 925 ). Then, it is checked whether or not the current value of the temporary counter 'i' is equal to or less than the number of the directional codes (pitch=8). In this case, since i=2, the process returns to step 924. At step 924, seg=1 and *(data)=1 and therefore the region (hist[1] [1]) relating to the directional code 1 at the second address of the sub-region 1 is incremented by 1. In this manner, the histogram for the sub-region 1 is produced as shown in FIG. 43. In this example, the sub-region 1 consists of eight directional codes 1, two directional codes 2, no directional codes 3 and three directional codes 4.

After the histogram for the sub-region 1 is produced, step 927 is carried out at which 'seg' is incremented by 1, so that the sub-region 2 is designated. Then, it is checked whether or not the designated sub-region is less than the number of the divided sub-regions (step 928). In this case, the result at step 928 is affirmative and thus the process returns to step 923. At step 923, the temporary counter 'i' is initialized, so that the counter 'i' indicates the beginning of the sub-region 2. Then, the histogram for the sub-region 2 is calculated as in the case of the sub-region 1. By the sequence of steps 923 to 928, the histograms for the sub-regions 1 to 7 are calculated as shown in FIG. 43. In general, the last sub-region 8 does not have the same number of the directional codes (pitch) as that of each of the sub-region 1 to 7. In the example shown in FIG. 42B, each of the sub-regions 1-7 has 13 directional codes, whereas the last sub-region has 15 directional codes. For this reason, the number of the directional codes in the sub-region 8 is calculated in accordance with pitch=N−pitch*(n−1) at step 929. In the example, N=106, pitch*(n−1)=13×(8−1)=91. Therefore, the pitch of the sub-region 8 is 15. Thereafter, a sequence of steps 930 to 932 (which are the same as steps 924 to 926, respectively) is repeated. As a result, the histogram for the sub-region 8 is produced as shown in FIG. 43.

STEPS 906 and 907

A step 906 calculates a distance between the histogram for each sub-region which is the feature quantity of the unknown character which is cut out of the character sequence and a predetermined feature of each reference character which is registered beforehand in the dictionary memory 80. A step 907 identifies the unknown character as the reference character having the feature of the shortest distance with respect to the unknown character.

Figure 45:
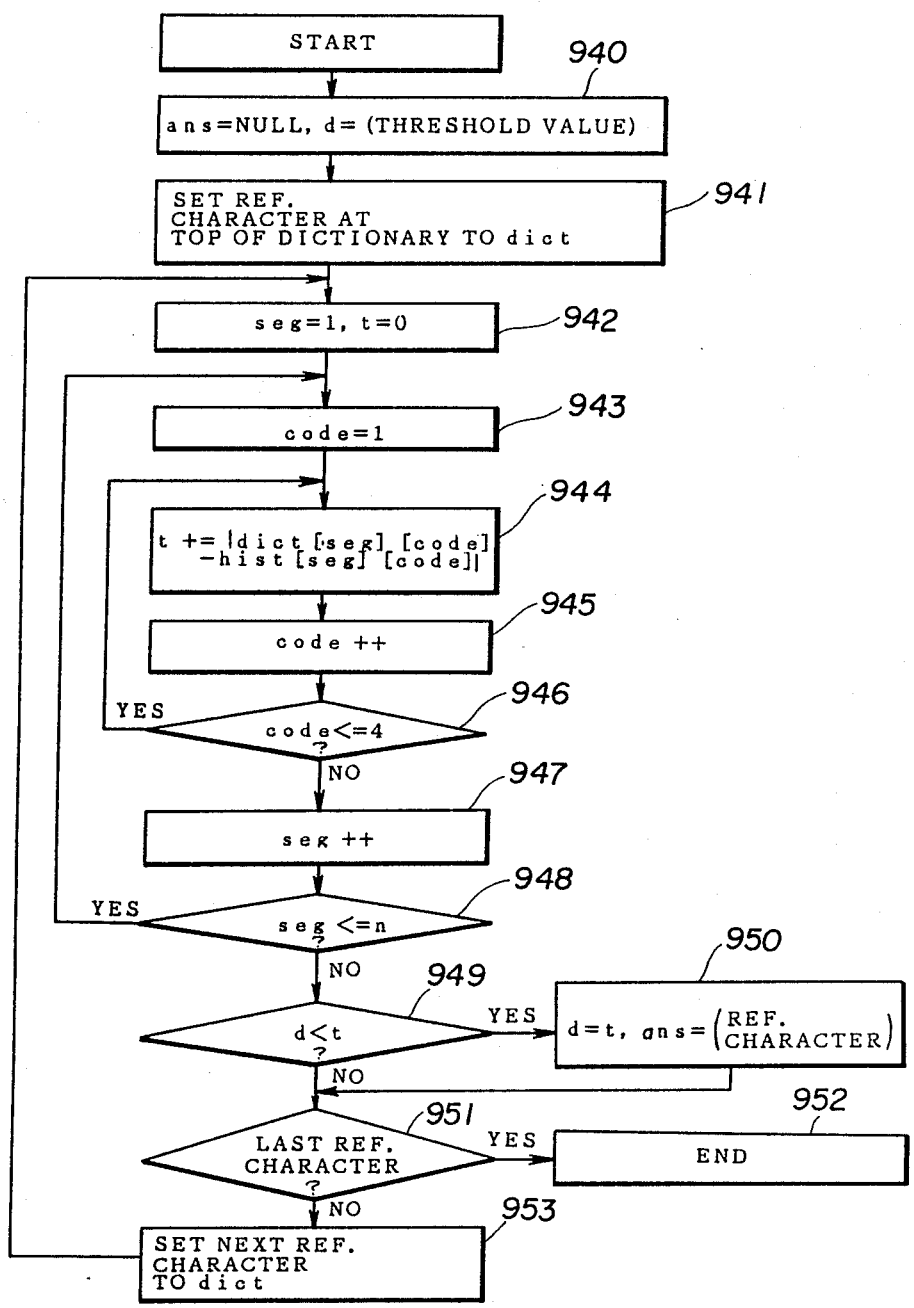
FIG. 45 is a flow chart for calculating a distance between the unknown character and the known character.

FIG. 45 is a flow chart of a detailed sequence of steps 906 and 907 shown in FIG. 40. First of all, symbols shown in FIG. 45 are defined as follows. A symbol 'd' denotes a variable which stores the distance between the unknown character and the known character registered in the dictionary memory 80. A symbol 'dict[n] [4]' denotes a reference histogram registered in the dictionary memory 80. A symbol 't' denotes a working region. A symbol 'ans' denotes a variable which stores an identified character. A symbol '+ =' denotes an operating symbol in which x+ =y means that x+y is inserted into x. The other symbols are the same as those shown in FIG. 44.

First, an initialization for 'ans' and 'd' is carried out (step 940) so that ans=NULL and d=(a threshold level) where NULL denotes a failure of identification (rejection). Next, a reference character positioned at the beginning of the dictionary is set to 'dict'. Then, a value 1 is set to 'seg' and a value 0 is set in 't' (step 942). Then, the setting of code=1 is carried out (step 943). Thereafter, a distance between each of four different directional codes and related codes of the reference character is calculated, and a calculated result is inserted into 't' (step 944). It the beginning, the distance is calculated for seg=1 and code=1. Therefore, the distance (difference) between the histogram (number) of the directional code 1 in the sub-region 1 of the unknown character and the histogram (number) of the directional code 1 of the sub-region of the reference character is calculated. Then, the variable 'code' is incremented by 1 (step 945) and is checked whether or not it is less than 4 (step 946). In this case, code=1 and therefore the process returns to step 944. Then, the calculation of the distance between the histogram of the directional code 2 in the sub-region 1 on the unknown character and the histogram of the directional code 2 in the sub-region of the reference character is carried out. In this manner, the distance between the histogram of each different directional code of the sub-region 1 and the histogram of the related directional code of the sub-region 1 of the reference character is carried out.

Thereafter, the variable 'seg' is incremented by 1 (step 947) and checked whether or not it is less than the value 'n' (step 948). In this case, the process returns to step 943 since seg=2. Then, the sequence of steps 943 to 948 is repeated. In this manner, all histograms relating to the unknown character are compared with the corresponding histograms relating to the reference character, and the distance between the unknown character and the reference character is obtained. Then, the calculated distance 'd' is checked whether or not it is shorter than the predetermined threshold 't' (step 951). If a result at step 949 is affirmative, the unknown character is identified as the reference character set at step 941 (step 950). If the result at step 949 is negative, it is checked whether or not the reference character set at step 941 is the last character registered in the dictionary memory 80 (step 951). If this reference character is not the last one, the next reference character is set in 'dict' (step 953) and returns to step 942.

The above-described identification process provided by the present invention has the following advantages. Firstly, the capacity of the memory for storing the directional code sequence can be reduced, since the directional code sequence is stored in the one-dimensional form therein. Secondly, the division of the region is carried out for the one-dimensional directional code. In addition, all of the sub-regions have the directional codes. Therefore, it is possible to effectively check the histograms of the directional codes. Thirdly, the division of the one-dimensional region can produce precise and stable histograms as compared to the division of the two-dimensional region.

In the above explanation, the identification process follows the feature extracting process described before with reference to FIGS. 21 through 38. However, the identification process is applicable to other feature extracting process. For example, it is possible to apply this process to a feature extracting process shown in FIGS. 46A through 46P. These figures show tables each defining one directional code depending on the combination of white and black pixels adjacent to the center pixel or the pixel of interest. For example, when all of four pixels are 0, the directional code 0 (shown on the left-hand side of the table) is designated. The identification process may be applied to the one-dimensional code sequence provided on the basis of the method shown in FIGS. 46A through 46P.

The present invention is not limited to the embodiments described above, but various variations and modifications may be made without departing from the scope of the present invention.

What is claimed is:

1. A pattern recognition method comprising the steps of:

detecting a first change in type between two consecutive pixels in a direction of a raster-scan which is carried out for a binary image of an unknown pattern, one of said two consecutive pixels being designated as a start point from which a trace of a contour of said binary image starts;

tracing said contour of said binary image in a predetermined direction along a predetermined type of pixels in such a way that four adjacent pixels on upper, lower, left-hand and right-hand sides of a point of interest are checked in a direction starting from one pixel out of said four adjacent pixels which is positioned on a predetermined side at an angle of 90 degrees with respect to a moving direction in which the trace proceeded towards said point of interest and that one pixel of a predetermined type out of said four adjacent pixels which is first found by checking said four adjacent pixels in said direction is designated as a next trace point subsequent to said point of interest;

extracting a feature of each of the pixels at the traced points which form an image of said contour of said pattern; and identifying said unknown pattern by comparing said features or said unknown pattern with features of a known pattern.

2. A pattern recognition method as claimed in claim 1, wherein said detecting step detects a first change in color from white to black and a white pixel of said two consecutive pixels is designated as said start point, and said tracing step traces said contour of said binary image in a counterclockwise direction along white pixels in such a way that four adjacent pixels on upper, lower, left-hand and right-hand sides of said point of interest are sequentially checked in the clockwise direction starting from said one pixel positioned on the left-hand side at an angle of 90° with respect to said moving direction in which the trace proceeded towards said point of interest and that a white pixel which is one of said four adjacent pixels and which is the first white pixel found by the clockwise check is designated as the trace point subsequent to said point of interest.

3. A pattern recognition method as claimed in claim 1, wherein said detecting step detects a change of color from white to black and a white pixel of said two consecutive pixels is designated as the start point, and said tracing step traces said contour of said binary image in a clockwise direction along white pixels in such a way that four adjacent pixels on upper, lower, left-hand and right-hand sides of said point of interest are sequentially checked in the counterclockwise direction starting from said one pixel positioned on the right-hand side at an angle of 90° with respect to said moving direction in which the trace proceeded towards said point of interest and that a white pixel which is one of said four adjacent pixels and which is the first white pixel found by the counterclockwise check is designated as the trace point subsequent to said point of interest.

4. A pattern recognition method as claimed in claim 1, wherein said detecting step detects a first change in color from white to black and a black pixel of said two consecutive pixels is designated as the start point, and said tracing step traces said contour of said binary image in a counterclockwise direction along black pixels in such a way that four adjacent pixels on upper, lower, left-hand and right-hand sides of said point of interest are sequentially checked in the counterclockwise direction starting from said one pixel positioned on the right-hand side at an angle of 90° with respect to said moving direction in which the trace proceeded towards said point of interest and that a black pixel which is one of said four adjacent pixels and which is the first pixel found by the counterclockwise check is designated as the trace point subsequent to said point of interest.

5. A pattern recognition method as claimed in claim 1, wherein said detecting step detects a first change in color from a white pixel and a black pixel of said two consecutive pixels is designated as the start point, and said tracing step traces said contour of said binary image in a clockwise direction along black pixels in such a way that four adjacent pixels on upper, lower, left-hand and right-hand sides of said point of interest are sequentially checked in the clockwise direction starting from said one pixel positioned on the left-hand side at an angle of 90 degrees with respect to said moving direction in which the trace proceeded towards said point of interest and that a black pixel which is one of said four adjacent pixels and which is the first black pixel found by the clockwise check is designated as the trace point subsequent to said point of interest.

6. A pattern recognition method as claimed in claim 2, wherein at the commencement of said tracing steps, said start point is designated as the point of interest and said moving direction in which the trace proceeded towards said trace point is assigned to be a direction opposite to a direction of said raster scan.

7. A pattern recognition method as claimed in claim 3, wherein at the commencement of said tracing steps, said start point is designated as the point of interest and said moving direction in which the the trace proceeded towards said trace point is assumed to be a direction opposite to a direction of said raster scan.

8. A pattern recognition method as claimed in claim 4, wherein at the commencement of said tracing steps, said start point is designated as the point of interest and said moving direction in which the the trace proceeded towards said trace point is assumed to be a direction identical to a direction of said raster scan.

9. A pattern recognition method as claimed in claim 5, wherein at the commencement of said tracing steps, said start point is designated as the point of interest and said moving direction in which the the trace proceeded towards said trace point is assumed to be a direction identical to a direction of said raster scan.

10. A pattern recognition method as claimed in claim 2, wherein in said tracing step, when said white pixel is the fourth pixel in said clockwise check, said white pixel is concluded to be a noise and is neglected.

11. A pattern recognition method as claimed in claim 3, wherein in said tracing step, when said white pixel is the fourth pixel in said counterclockwise check said white pixel is concluded to be a noise and is neglected.

12. A pattern recognition method as claimed in claim 4, wherein in said tracing step, when said white pixel is the fourth pixel in said counterclockwise check, said black pixel is concluded to be a noise and is neglected.

13. A pattern recognition method as claimed in claim 5, wherein in said tracing step, when said white pixel is the fourth pixel in said clockwise check, said black pixel is concluded to be a noise and is neglected.

14. A pattern recognition method comprising the steps of:
  detecting a change in type between two consecutive pixels in a direction of a raster-scan which is carried out for a binary image of an unknown pattern, one of said two consecutive pixels being designated as a start point from which trace of a contour of said binary image starts;
  tracing said contour of said binary image in a predetermined direction along a predetermined type of pixels in such a way that four adjacent pixels on upper, lower, left-hand and right-hand sides of a point of interest are checked in a predetermined rotational direction starting from one pixel out of said four adjacent pixels which is positioned on a predetermined side at an angle of 90° with respect to a moving direction in which the trace proceeded towards said point of interest and that one pixel of a predeterminted type out of said four adjacent pixels which is first found by said check is designated as a next trace point following said point of interest;
  extracting a feature of each of the pixels at the traced points which form an image of said contour of said pattern, said feature being a directional code which indicates a moving direction from said point of interest to said next trace point; and
  identifying said unknown pattern by comparing said features of said unknown pattern with features of a known pattern.

15. A pattern recognition method as claimed in claim 14, wherein said detecting step detects a first change in color from white to black and a white pixel of said two consecutive pixels is designated as said start point, and said tracing step traces said contour of said binary image in a counterclockwise direction along white pixels in such a way that four adjacent pixels on upper, lower, left-hand and right-hand sides of said point of interest are sequentially checked in the clockwise direction starting from said one pixel positioned on the left-hand side at an angle of 90° with respect to said moving direction in which the trace proceeded towards said point of interest and that a white pixel which is one of said four adjacent pixels and which is the first white pixel found by the clockwise check is designated as the trace point subsequent to said point of interest.

16. A pattern recognition method as claimed in claim 14, wherein said detecting step detects a change of color from white to black and a white pixel of said two consecutive pixels is designated as the start point, and said tracing step traces said contour of said binary image in a clockwise direction along white pixels in such a way that four adjacent pixels on upper, lower, left-hand and right-hand sides of said point of interest are sequentially checked in the counterclockwise direction starting from said one pixel positioned on the right-hand side at an angle of 90° with respect to said moving direction in which the trace proceeded towards said point of interest and that a white pixel which is one of said four adjacent pixels and which is the first white pixel found by the counterclockwise check is designated as the trace point subsequent to said point of interest.

17. A pattern recognition method as claimed in claim 14, wherein said detecting step detects a first change in color from white to black and a black pixel of said two consecutive pixels is designated as the start point, and said tracing step traces said contour of said binary image in a counterclockwise direction along black pixels in such a way that four adjacent pixels on upper, lower, left-hand and right-hand sides of said point of interest are sequentially checked in the counterclockwise direction starting from said one pixel positioned on the right-hand side at an angle of 90° with respect to said moving direction in which the trace proceeded towards said point of interest and that a black pixel which is one of said four adjacent pixels and which is the first pixel found by the counterclockwise check is designated as the trace point subsequent to said point of interest.

18. A pattern recognition method as claimed in claim 14, wherein said detecting step detects a first change in color from white to pixel and a black pixel of said two consecutive pixels is designated as the start point, and said tracing step traces said contour of said binary image in a clockwise direction along black pixels in such a way that four adjacent pixels on upper, lower, left-hand and right-hand sides of said point of interest are sequentially checked in the clockwise direction starting from said one pixel positioned on the left-hand side at an angle of 90° with respect to said moving direction in which the trace proceeded towards said point of interest and that a black pixel which is one of said four adjacent pixels and which is the first black pixel found by the clockwise check is designated as the trace point subsequent to said point of interest.

19. A pattern recognition method as claimed in claim 15, wherein at the commencement of said tracing steps, said start point is designated as the point of interest and said moving direction in which the trace proceeded towards said trace point is assigned to be a direction opposite to a direction of said raster scan.

20. A pattern recognition method as claimed in claim 16, wherein at the commencement of said tracing steps, said start point is designated as the point of interest and said moving direction in which the the trace proceeded towards said trace point is assumed to be a direction opposite to a direction of said raster scan.

21. A pattern recognition method as claimed in claim 17, wherein at the commencement of said tracing steps, said start point is designated as the point of interest and said moving direction in which the the trace proceeded towards said trace point is assumed to be a direction identical to a direction of said raster scan.

22. A pattern recognition method as claimed in claim 18, wherein at the commencement of said tracing steps, said start point is designated as the point of interest and said moving direction in which the the trace proceeded towards said trace point is assumed to be a direction identical to a direction of said raster scan.

23. A pattern recognition method as claimed in claim 15, wherein in said tracing step, when said white pixel is the fourth pixel in said clockwise check, said white pixel is concluded to be a noise and is neglected.

24. A pattern recognition method as claimed in claim 16, wherein in said tracing step, when said white pixel is the fourth in said counterclockwise check, said white pixel is concluded to be a noise and is neglected.

25. A pattern recognition method as claimed in claim 17, wherein in said tracing step, when said white pixel is the fourth in said counterclockwise check, said white pixel is concluded to be a noise and is neglected.

26. A pattern recognition method as claimed in claim 18, wherein in said tracing step, when said white pixel is the fourth in said clockwise check, said white pixel is concluded to be a noise and is neglected.

27. A pattern recognition method comprising the steps of:
tracing a contour of a binary image of an unknown pattern which is obtained by a raster-scan;
extracting a feature of each of pixels at said contour which form an image of said contour of said unknown pattern;
registering said feature of each of pixels in a memory region in order of appearance of said feature, so that a one-dimensional code sequence is registered in said memory region;
dividing said memory region which stores said one-dimensional code sequence into a plurality of one-dimensional sub-regions, each including a plurality of partial code sequences;
calculating a feature quantity for each of sub-regions; and
identifying said unknown pattern by comparing said feature quantity for each sub-region of said unknown pattern with a feature quantity for each respective sub-region of a known pattern.

28. A pattern recognition method as claimed in claim 27, wherein at said dividing step, said memory region which stores said one-dimensional code sequence is equally divided into the plurality of one-dimensional sub-regions.

29. A pattern recognition method as claimed in claim 27, wherein at said dividing step, the one-dimensional code sequence is divided into partial code sequences and forms sub-regions in which there are combined at least m (m is an integer equal to 3 or over) consecutive partial code sequences in such a way that partial directional codes at the beginning and end thereof are commonly owned by the mutually adjacent sub-regions.

30. A pattern recognition method as claimed in claim 27, wherein said feature quantity is a histogram indicating a total number for each respective directional code for each sub-region.

31. A pattern recognition method as claimed in claim 27, wherein said tracing step comprises
a first step of detecting a first scanned pixel immediately followed by a pixel of a type opposing a type of said first scanned pixel in a direction of a raster-scan which is carried out for a binary image of an unknown pattern, said first scanned pixel being designated as a start point from which trace of a contour of said binary image starts; and a second step of tracing said contour of said binary image in a predetermined direction along a predetermined type of pixels in such a way that four adjacent pixels on upper, lower, left-hand and right-hand sides of a point of interest are checked in a predetermined rotational direction starting from one pixel out of said four adjacent pixels which is positioned on a predetermined side at an angle of 90 degrees with respect to a moving direction in which the trace proceeded towards said point of interest and that one pixel of a predetermined type out of said four adjacent pixels which is first obtained by checking said four adjacent pixels in said predetermined rotational check is designated as a next trace point subsequent to said point of interest.

* * * * *